US009363024B2

(12) United States Patent
Nguyen et al.

(10) Patent No.: US 9,363,024 B2
(45) Date of Patent: Jun. 7, 2016

(54) METHOD AND SYSTEM FOR ESTIMATION AND EXTRACTION OF INTERFERENCE NOISE FROM SIGNALS

(71) Applicant: U.S. Army Research Laboratory ATTN: RDRL-LOC-I, Adelphi, MD (US)

(72) Inventors: Lam H. Nguyen, Laurel, MD (US); Trac D. Tran, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 59 days.

(21) Appl. No.: 14/452,902

(22) Filed: Aug. 6, 2014

(65) Prior Publication Data

US 2014/0347213 A1 Nov. 27, 2014

Related U.S. Application Data

(63) Continuation-in-part of application No. 13/891,050, filed on May 9, 2013, which is a continuation-in-part of application No. 13/477,282, filed on May 22, 2012, now Pat. No. 8,824,544, which is a continuation-in-part of application No. 13/416,062, filed on Mar. 9, 2012, now Pat. No. 8,861,588.

(51) Int. Cl.
*G01S 7/292* (2006.01)
*G01S 13/90* (2006.01)
(Continued)

(52) U.S. Cl.
CPC ............. *H04B 15/00* (2013.01); *G01S 7/023* (2013.01); *G01S 13/0209* (2013.01); *G01S 13/90* (2013.01); *H04L 27/0004* (2013.01); *H04B 1/71632* (2013.01); *H04B 17/345* (2015.01)

(58) Field of Classification Search
CPC .... H04B 1/69; H04B 1/7163; H04B 1/71632; H04B 15/00; H04B 17/30; H04B 17/309; H04B 17/345; H04B 1/38; H04B 1/40; H04B 1/50; H04B 1/52; H04B 1/525; H04B 1/707; H04B 1/7097; H04B 1/71; H04B 1/7101; H04B 1/7107; H04L 27/00; H04L 27/0004; G01S 7/02; G01S 7/023; G01S 13/02; G01S 13/0209; G01S 13/88; G01S 13/89; G01S 13/90; G01S 7/28; G01S 7/2813; G01S 7/285; G01S 7/292; G01S 7/2923; G01S 7/36; G01S 7/38; G01S 13/9035; G01S 13/95; G01S 13/951; G06K 9/62; G06K 9/6217; G06K 9/6232; G06K 9/624; G06K 9/6244; G10L 25/48
USPC .......... 342/25 R–25 F, 89–93, 175, 192–197, 342/13–20, 26 R, 159–164, 176, 179, 73, 342/82–84; 455/39, 63.1; 382/181, 209, 382/217, 218; 375/130, 140, 147, 224, 295, 375/296, 316, 322, 324, 327, 346–351
See application file for complete search history.

(56) References Cited

U.S. PATENT DOCUMENTS 3,710,256 A * 1/1973 Lewis ...................... G01S 7/38
342/15
4,573,052 A * 2/1986 Guillerot ............... G01S 7/2813
342/19
(Continued)

OTHER PUBLICATIONS

T. Miller, L Potter, and J. McCorkle, "RFI Suppression for Ultra Wideband Radar," IEEE Transactions on Aerospace and Electronic Systems, vol. 33, No. 4,Oct. 1997.
(Continued)

*Primary Examiner* — Bernarr Gregory
(74) *Attorney, Agent, or Firm* — Lawrence E. Anderson

(57) ABSTRACT

A system for reception of electromagnetic waves in spectrum in which interference occurs comprising at least one transmitter; at least one receiver configured to receive the received signal; a first memory portion configured to store data relating to a point target response; a spectrum estimator configured to estimate the frequencies at which interfering signals occur; at least one processor configured to generate an estimation of the interfering signals at the frequencies estimated by the spectrum estimator; a second memory portion operatively connected to the at least one processor configured to store the estimation of the components of the interfering signals; the at least one processor configured to substantially reduce or eliminate radio frequency interfering signals from the received signal utilizing the point target response and the estimation of the interfering signals; and a method to substantially reduce or eliminate radio frequency interfering signals from for image data.

20 Claims, 12 Drawing Sheets
(9 of 12 Drawing Sheet(s) Filed in Color)

(51) Int. Cl.
*H04B 15/00* (2006.01)
*G01S 7/02* (2006.01)
*G01S 13/02* (2006.01)
*H04L 27/00* (2006.01)
*G01S 13/00* (2006.01)
*H04B 1/7163* (2011.01)
*H04B 17/345* (2015.01)

(56) References Cited

U.S. PATENT DOCUMENTS

| | | | | | |
|---|---|---|---|---|---|
| 4,682,172 | A | * | 7/1987 | Kuhrdt | G01S 7/38 342/15 |
| 4,689,622 | A | * | 8/1987 | Kuhrdt | G01S 7/38 342/14 |
| 4,713,662 | A | * | 12/1987 | Wiegand | G01S 7/38 342/13 |
| 4,885,587 | A | * | 12/1989 | Wiegand | G01S 7/38 342/14 |
| 4,891,646 | A | * | 1/1990 | Wiegand | G01S 7/38 342/14 |
| 5,068,597 | A | * | 11/1991 | Silverstein | G01S 13/9035 342/192 |
| 5,394,155 | A | * | 2/1995 | Rubin | G01S 13/951 342/192 |
| 5,396,250 | A | * | 3/1995 | Tsui | G01S 7/2923 342/13 |
| 5,706,013 | A | * | 1/1998 | Melvin | G01S 7/2923 342/159 |
| 5,805,098 | A | * | 9/1998 | McCorkle | G01S 13/9035 342/179 |
| 6,400,310 | B1 | * | 6/2002 | Byrnes | G10L 25/48 342/84 |
| 6,768,444 | B2 | * | 7/2004 | Langsford | G01S 7/2813 342/13 |
| 6,822,606 | B2 | * | 11/2004 | Ponsford | G01S 7/292 342/159 |
| 6,937,676 | B2 | * | 8/2005 | Takada | H04B 1/71 375/346 |
| 7,031,402 | B2 | * | 4/2006 | Takada | H04B 1/7101 375/296 |
| 7,796,829 | B2 | * | 9/2010 | Nguyen | G01S 13/90 342/26 R |
| 8,193,967 | B2 | * | 6/2012 | Nguyen | G01S 13/90 342/25 F |
| 8,320,504 | B2 | * | 11/2012 | Peng | H04B 1/525 375/327 |
| 8,620,093 | B2 | * | 12/2013 | Nguyen | G06K 9/6244 382/218 |
| 8,624,773 | B2 | * | 1/2014 | Nguyen | G01S 13/9035 342/179 |
| 8,665,132 | B2 | * | 3/2014 | Ranney | G01S 13/90 342/179 |
| 8,824,544 | B2 | * | 9/2014 | Nguyen | G01S 13/90 375/224 |
| 8,855,580 | B2 | * | 10/2014 | Dent | H04B 1/525 455/63.1 |
| 8,861,588 | B2 | * | 10/2014 | Nguyen | G01S 13/90 375/224 |
| 9,172,476 | B2 | * | 10/2015 | Nguyen | G01S 13/90 |
| 2002/0155812 | A1 | * | 10/2002 | Takada | H04B 1/7101 455/63.1 |
| 2010/0302086 | A1 | | 12/2010 | Dudgeon et al. | |
| 2012/0033713 | A1 | * | 2/2012 | Yang | H04B 1/7107 375/147 |
| 2013/0244710 | A1 | | 9/2013 | Nguyen et al. | |
| 2014/0347213 | A1 | | 11/2014 | Nguyen | |

OTHER PUBLICATIONS

Lam H Nguyen, Trac D Tran, Thong T Do, "Sparse Models and Sparse Recovery for Ultra-wideband SAR Applications," IEEE Transactions on Aerospace and Electronic Systems, Apr. 2014.

Lam Nguyen, Thong Do, Trac Tran, "Sparse Models and Sparse Recovery with Ultra-wideband SAR Applications," 1st International Workshop on Compressed Sensing Applied to Radar, May 2012.

Lam Nguyen, Trac Tran, "Robust and Adaptive Extraction of RFI Signals from Ultra-Wideband Radar Data," IEEE International Geoscience and Remote Sensing (IGARSS), Jul. 2012.

Lam Nguyen and Trac Tran, "Robust Recovery of Synthetic Aperture Radar Data from Uniformly Under-Sampled Measurements," IEEE IGARSS, (Jun. 28, 2011).

E. Candès and T. Tao, "Decoding by linear programming," IEEE Trans. on Information Theory, vol. 51, No. 12, pp. 4203-4215 (Dec. 2005).

M. A. T. Figueiredo, R. D. Nowak, and S. J. Wright, "Gradient projection for sparse reconstruction: Application to compressed sensing and other inverse problems," IEEE Journal of Selected Topics in Signal Processing: Special Issue on Convex Optimization Methods for Signal Processing, vol. 1, No. 4, pp. 586-598 (Apr. 2007).

J. Tropp and A. Gilbert, "Signal recovery from random measurements via orthogonal matching pursuit," IEEE Trans. on Information Theory, vol. 53, No. 12, pp. 4655-4666 (Dec. 2007).

D. Needell and R. Vershynin, "Signal recovery from incomplete and inaccurate measurements via regularized orthogonal matching pursuit," IEEE Journal of Selected Topics in Signal Processing, vol. 4, pp. 310-316 (Apr. 2010).

W. Dai and O. Milenkovic, "Subspace pursuit for compressive sensing: Closing the gap between performance and complexity," IEEE Trans. on Information Theory, vol. 55, pp. 2230-2249 (May 2009).

T. T. Do, L. Gan, N. H. Nguyen, and T. D. Tran, "Sparsity adaptive matching pursuit algorithm for practical compressed sensing," in Proc. Asilomar Conf. on Signals, Systems, and Computers, pp. 581-587, Pacific Grove (Oct. 2008).

X. Luo, L. M. H. Ulander, J. Askne, G. Smith, and P-0. Frolind, "RFI suppression in ultra-wideband SAR systems using LMS filters in frequency domain," Electronics Letters, vol. 37, No. 4, pp. 241-243, 2001.

X.-Y. Wang, W.-O. Yu, X.-Y. Qi, and Y. Liu, "RFI suppression in SAR based on approximated spectral decomposition algorithm," Electronics Letters, vol. 48, No. 10, pp. 594-596, 2012.

R.T. Lord and M.R. Inggs, "Efficient RFI suppression in SAR using LMS adaptive filter integrated with range/Doppler algorithm," Electronics Letters, vol. 35, No. 8, pp. 629-630. Apr. 1999.

V. T. Vu, T. K. Sjogren, M. I. Pettersson, and L. Hakasson, "An approach to suppress RFI in ultrawideband low frequency SAR," Proc. IEEE Ink Radar Conference, pp. 1381-I385, 20IO.

S. I. Kelly and M. E. Davies, "RFI suppression and sparse image formation for UWB SAR," Proc. IEEE 14th Int. Radar Symposium (IRS), vol. 2, pp. 655-660, 2013.

\* cited by examiner

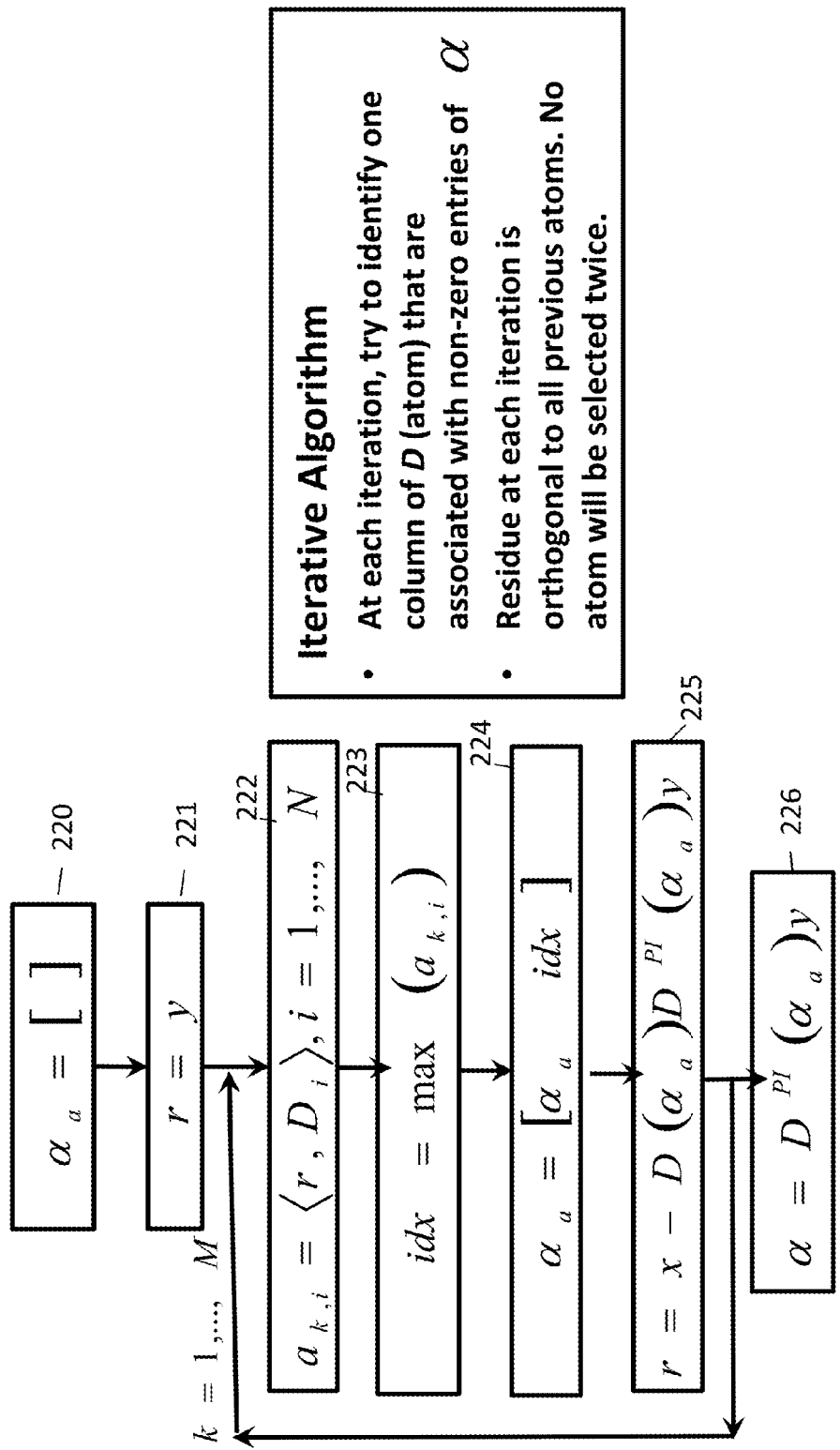
FIG. 4 Block Diagram of Orthogonal Matching Pursuit (OMP) Algorithm

FIG. 7 Raw (Before Imaging) Radar Data with Interference Noise

METHOD AND SYSTEM FOR ESTIMATION AND EXTRACTION OF INTERFERENCE NOISE FROM SIGNALS

CROSS REFERENCE TO RELATED APPLICATIONS

This application is a continuation-in-part of and claims priority to U.S. patent application Ser. No. 13/891,050, entitled "Method and System for Removal of Noise in Signal," by Lam H. Nguyen and Trac D. Tran filed May 9, 2013 (ARL 11-77 CIP2), now U.S. Pat. No. 9,172,476, which is a continuation-in-part of and claims priority to U.S. patent application Ser. No. 13/477,282 entitled "Method and System for Recovery of Missing Spectral Information in Wideband Signal" by Lam H. Nguyen and Thong Do filed May 22, 2012 (ARL 11-77CIP), now U.S. Pat. No. 8,824,544, which is a continuation-in-part and claims priority to U.S. patent application Ser. No. 13/416,062 entitled "Apparatus and Method for Sampling and Reconstruction of Wide Bandwidth Signals below Nyquist Rate," by Lam H. Nguyen and Trac D. Tran filed Mar. 9, 2012; all of which are hereby incorporated by reference now U.S. Pat. No. 8,861,588.

STATEMENT OF GOVERNMENT INTEREST

The embodiments herein may be manufactured, used, and/or licensed by or for the United States Government without the payment of royalties thereon.

BACKGROUND OF THE INVENTION

The present invention relates to, inter alia, noise extraction from a signal. The signal may be used, for example, in the generation of images from projection measurements. Examples of images generated from projection measurements include two-dimensional and three-dimensional SAR (synthetic aperture radar) systems, such as that disclosed in U.S. Pat. No. 5,805,098 to McCorkle, hereby incorporated by reference, wherein an aircraft mounted detector array is utilized to take ground radar measurements. Other examples of systems relating to noise extraction from a signal include fault inspection systems using acoustic imaging, submarine sonar for imaging underwater objects, imaging systems for tunnel detection, oil exploration, geological surveys, etc., and medical diagnostic tools such as sonograms, echocardiograms, x-ray CAT (computer-aided tomography) equipment and MRI (magnetic resonance imaging) equipment.

The U.S. Army has been developing low-frequency ultra-wideband systems to detect targets in foliage, explosive devices buried in the ground, moving targets behind walls or barriers (sensing-through-the-wall). Such systems operate in the low-frequency spectrum than spans from under 100 MHz to several GHz in order to have penetration capability while maintaining high image resolution. Therefore, these systems must operate in the low-frequency spectrum that spans from under 100 MHz to several GHz in order to achieve the penetration capability. A critical challenge for ultra-wideband radar is that collected radar information is corrupted in both the time and frequency domain by radio frequency interference (RFI) signals within the operating spectrum of UWB radar, as the signal occupies a wide spectrum that is also shared by radio, TV, cellular phone, wireless networking, amateur radio and other systems. Because of this interference, the received signal contains spectral content that includes many frequency subbands that are corrupted by energy from all other sources. Within these corrupted subbands, the energy of the received signal is much smaller than that from the interference sources, since the interfering signals are essentially large amplitude noise that often masks the underlying radar signals. In the time domain, the signal is very noisy and might be embedded in the noise floor. Except for targets with very large amplitudes, targets may not be detectable in the presence of interference noise. Conventional techniques usually detect the corrupted frequency bands (due to the interference sources) by searching for the spikes in the spectral domain. The fast Fourier transform (FFT) bins that correspond to the contaminated frequency bands are zeroed out. This technique results in severe sidelobes in the time or spatial domain of the output data and imagery due to the sharp transitions (frequency samples with no information) in the frequency domain. In addition, simply suppressing the information in the contaminated frequency bands will reduce the signal-to-noise ratio (SNR) of the received signal.

One noise suppression technique that has been widely employed in practice involves implementing adaptive notch filters (whose notches in the frequency domain correspond to interference noise components) to suppress the energy from interference noise signals. Depending on the nature of interference noise sources, the notch-filter approach generally results in (i) large sidelobes in the time domain of the received signal and (ii) reduced target amplitudes since our transmitted radar signals are UWB and notching partially eliminates the radar signals of interest. It is generally more desirable to extract the interference noise from signal directly in the time domain for best performance. To avoid the side effects of the notch-filter implementation, Timothy Miller, et al., in the publication entitled "RFI Suppression for Ultra Wideband Radar," IEEE Transactions on Aerospace and Electronic Systems, vol. 33, no. 4, (October 1997) (herein incorporated by reference) proposed an interference noise suppression technique that estimates the noise components and subtracts (in the time domain) the estimated noise signal from the received radar signal. However, the technique requires complete knowledge of the interference sources. The technique is based on the assumption that the interference sources consist of a number of narrowband amplitude modulation (AM) and frequency modulation (FM) channels. This assumption is no longer valid with the current frequency spectrum, in which most of the communications and TV channels are broadcasting using various digital modulation schemes. Within each communications channel, the radio frequency (RF) signal looks like white noise in the time domain with its amplitude and phase quickly varying with respect to time. Thus, it is not practical to use the Miller technique to estimate these RF interference (RFI) components with digital modulation contents. Besides parametric noise modeling, spectral decomposition, and adaptive filtering have also been explored to solve the RFI problem and so far have yielded limited successes. Most can only provide acceptable results with one particular source of RFI.

SUMMARY OF THE INVENTION

The present invention is directed to system for reception of electromagnetic waves in spectrum in which interference with radio frequencies of other electronics devices occurs comprising;

at least one transmitter configured to transmit signals at a wide range of frequencies, including frequencies in which RF devices transmit;

at least one receiver configured to receive the received signal;

a first memory portion configured to store data relating to a point target response of the system derived from the transmitted signals;

a spectrum estimator configured to estimate the frequencies at which interfering signals occur;

at least one processor operatively connected to the receiver, the first memory portion and the spectrum estimator; the at least one processor configured to generate an estimation of the interfering signals at the frequencies estimated by the spectrum estimator;

a second memory portion operatively connected to the at least one processor configured to store the estimation of the components of the interfering signals; the at least one processor configured to substantially reduce or eliminate radio frequency interfering signals from the received signal utilizing the point target response from the first memory portion and the estimation of the interfering signals from the second memory portion.

An alternate preferred embodiment system for reception of electromagnetic waves in spectrum in which interference with radio frequencies of other electronics devices occurs comprises;

at least one transmitter configured to transmit signals at a wide range of frequencies, including frequencies in which RF devices transmit;

at least one receiver configured to receive the received signal;

a first memory portion configured to store data relating to a point target response of the system derived from the transmitted signals;

a spectrum estimator configured to estimate the frequencies at which interfering signals occur;

at least one processor operatively connected to the receiver, the first memory portion and the spectrum estimator; the at least one processor configured to generate an estimation of the interfering signals at the frequencies estimated by the spectrum estimator;

a second memory portion operatively connected to the at least one processor configured to store the estimation of the components of the interfering signals;

the at least one processor configured to substantially reduce or eliminate radio frequency interfering signals from the received signal by utilizing an optimization process in conjunction with the point target response from the first memory portion and the estimation of the components of the interfering signals from the second memory portion to jointly determine a composite response of the target or targets from a scene of interest.

The present invention is also directed to a method for obtaining image data utilizing the transmission of electromagnetic waves in spectrum in which interference with electromagnetic waves at various frequencies occurs comprising;

providing at least one processor;

providing at least one transmitter operatively connected to the at least one processor;

providing at least one receiver operatively connected to the at least one processor;

transmitting signals into a target area having a wide frequency range, including frequencies in which other RF devices transmit;

using the at least one receiver, receiving a signal comprising the reflection of the transmitted signals and interfering signal data from other RF devices;

providing a first memory portion for storing replicas of the point target response signal operatively associated with the at least one processor;

providing a spectrum estimator operatively associated with the at least one receiver and the at least one processor configured to identify the frequency bands at which interfering signals occupy;

generating an estimation of the interfering signals at the frequencies estimated by the spectrum estimator for storage in the second memory portion;

providing a second memory portion to store the estimation of components of the interfering signals;

matching the receive signal with stored replicas of the point target response and extracting data relating to the interfering signals from the received signal to determine a composite response of the target or targets from a scene of interest.

In conjunction with the above preferred embodiment systems and method, as an option the spectrum estimator may operate to determine interfering signals such as jamming signals, noise, cross-talk, cell phones, citizen band radios, television, radio and radar. In addition, the estimation of the components of the interfering signal stored in the second memory may be generated using sinusoidal representations. In addition, the at least one processor may be configured to utilize an optimization process in conjunction with the sinusoidal representations to determine amplitudes and frequency locations of the noise components in the received signal. As a further option, the at least one processor may be configured to use an optimization process in conjunction with the point target response from the first memory portion and the components of the interfering signal from the second memory portion to jointly determine a composite response of the target or targets from a scene of interest and the estimated interfering signals. The optimization process may be one of orthogonal matching pursuit, basis pursuit, gradient projection, matching pursuit, orthogonal matching pursuit, regularized matching pursuit or subspace pursuit. As a further option, the sinusoidal representations may be generated using the equation $$D_{ij}^{rfi}=[\cos(2\pi(f_L(j)+k\Delta f_D))|\sin(2\pi(f_L(j)+k\Delta f_D)]$$
$$k=0,\ldots,N_j-1$$

where j is the index for the RFI frequency band, $f_L(j)$ is the lowest frequency of the detected band, k is the frequency index, $\Delta f_D$ is the frequency increment, $N_j$ is the total number of sine and cosine pairs within the RFI frequency band and wherein components of $D_{ij}^{rfi}$ are concatenated for insertion into the second memory portion.

As another option the first memory portion may be constructed using phase shifted replicas of the point target response which correspond to received signals reflected back from objects in the scene of interest located at specific distances, and the at least one processor may be configured to match the receive data with stored replicas of the point target response to determine a composite response of the target or targets from a scene of interest.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The embodiments herein will be better understood from the following detailed description with reference to the drawings.

FIG. 4 is a block diagram of an Orthogonal Matching Pursuit (OMP) algorithm.

FIG. 6 includes the frequency ranges in which FM, digital TV and cellular phones operate.

DETAILED DESCRIPTION OF PREFERRED EMBODIMENTS

Figure 1:
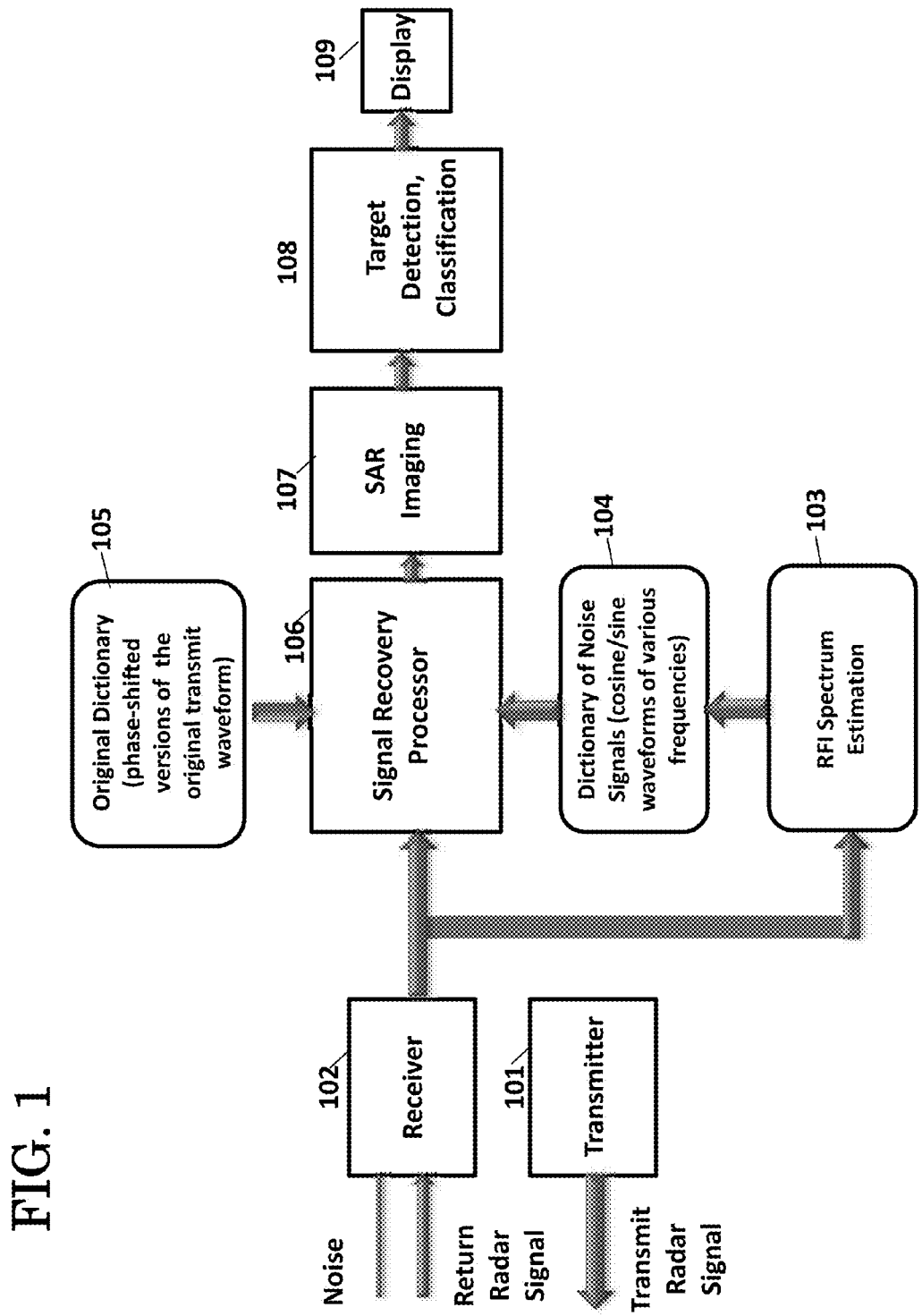
FIG. 1 is a schematic block diagram of a preferred embodiment of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. For example, when referring first and second elements, these terms are only used to distinguish one element from another element. Thus, a first element could be termed a second element, without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A preferred embodiment of the present invention comprises a sparse-recovery model and reconstruction scheme. The invention allows the reconstruction of a wideband signal following the extraction of RFI noise.

Although the invention is demonstrated with the application of this technique to radar applications, the noise extraction technique of the present invention also works with other communication systems, including television reception and transmission, headphones with noise filters, and other communications devices; especially ones that employ ultra high-frequency modulation schemes.

U.S. patent application Ser. No. 13/477,282 ('282 Application) entitled "Method and System for Recovery of Missing Spectral Information in Wideband Signal" by Lam H. Nguyen and Thong Do filed May 22, 2012 (ARL 11-77CIP), now U.S. Pat. No. 8,824,544, to which priority is being claimed, discloses a sparsity-driven technique that directly estimates the interference noise components in the time domain and extracts them from radar data. In the '282 Application, a first memory or dictionary comprises time-shifted responses based upon the wide band signal responses and a second memory or dictionary comprises a plurality of spectrally filtered time-shifted responses. The first and second memories (or dictionaries) operate to provide data to the processor to compensate for the information missing at the plurality of frequencies.

U.S. patent application Ser. No. 13/891,050 ('050) (a continuation-in-part of the '282 application; to which priority is also claimed) entitled "Method and System for Removal of Noise in Signal," filed May 9, 2013, now U.S. Pat. No. 9,172,476, discloses a system comprising, inter alia, a processor, a first memory or dictionary for storing transmitted signal waveforms; a second memory or dictionary for storing RF interfering signal data; and a switch for periodically allowing the RF interfering signal data to enter the second memory portion from the receiver. The processor operates to process the received signal containing RF interfering signal data by matching the received signal against data relating to the transmitted signal waveforms from the first memory portion (or dictionary) and RF interfering signal data from the second memory portion (or dictionary) and extract the RF interfering signal data. The time-domain extraction of RFI noise does not result in (i) large side-lobes in the time domain of the received signal and (ii) reduced target amplitudes and are adaptive to a changing environment.

Unfortunately, the technique of the '050 Application has a significant drawback as the radar system has to continuously monitor the surrounding environment in order to build a sparse-representation dictionary for the interference sources. In order to determine the background noise, the system disclosed in the '050 Application incorporates noise-only intervals that occur when the transmitter is turned off and the data switch sends the noise signals to the memory buffer in which dictionary resides via channel to construct a "noise" dictionary. During the standard radar transmit and receive cycle a pulse repetition frequency (PRF) is established where the signal is first transmitted by the transmitter. Depending upon the range or distance in which targets are to be detected, the receiver waits a time interval t=2R/c where R is the range and c is the speed of light. During the operation of the '050 Application system however, after a certain number of PRF cycles, transmission is stopped and the noise is observed whereupon the data switch is programmed to allow noise data to enter the noise dictionary. Noise data from the noise signal (i.e., the return signal occurring when no transmission from the transmitter is taking place) is entered into a first column of a noise dictionary the noise dictionary using a shifted window mechanism or approach. To enter the second column, the window is effectively shifted a minute amount, and the second column is data realized from the shifted interval of the noise signal. Similarly, columns of noise data are entered into the noise dictionary during the time interval when the switch diverts the data from the signal recovery processor into the noise dictionary. Noise data using the sliding window approach may be entered by an additional processor or processor or such operations may be performed by the signal recovery processor. Since the noise in the return signal is detected during the intervals during which the transmitter does not transmit, there is no signal component present in the return signal. Since the signal may be transmitted and received in a matter of nanoseconds, the interval between the PRF cycles and the reception of the noise only signal for the purposes of entering data into the noise dictionary may occur within a matter of nanoseconds or tens of nanoseconds. At other intervals when the transmitter are turned on, the data switch 9 allows the received signals that include noisy radar signals to pass to the signal recovery processor for processing. In addition to the noise dictionary, the '050 Application discloses another dictionary that includes many time-shifted versions of the transmitted waveform, which may be stored columns beginning with data at the beginning of the range of interest. For example, if the range of interest is between 1000 meters to 5000 meters, the first column of data in the signal dictionary may be a pulse representing the appearance of a target at 1000 meters. In the '050 Application, the signal recovery processor utilizes the noise dictionary to estimate and extract the noise signal components from the noisy receive signals to generate clean radar signals. Specifically, the lower or noise dictionary includes the column of noise data which are to be extracted out of the processed signal in combination with the processing of the time-shifted versions of the transmitted waveform included in the other dictionary. The output of the signal recovery processor is the received signal with reduced noise level. In the '050 Application, the output signals from the signal recovery processor are sent to the image processor, and subsequently, to the target detection and discrimination. The resulting synthetic aperture radar (SAR) image and detection information are then visualized by the display. A further description of the image formation is found in U.S. Pat. No. 7,796,829 entitled "Method and System for Forming an Image with Enhanced Contrast and/or Reduced Noise, by Lam H. Nguyen and Jeffrey Sichina, issued Sep. 14, 2010, herein incorporated by reference.

The process of monitoring of the environment by turning the radar transmitter off occasionally while leaving the receiver on is known as "sniffing." Whenever the radar system is in the sniffing stage, i.e., with the transmitter turned off, the receiver collects only the vital information on the interference (since there is no radar signal present). However, even this simple "sniffing" solution still has two weaknesses: (i) it increases the complexity of the system control; and (ii) it reduces the system's effective pulse repetition frequency (PRF). In order to capture the interference characteristics accurately, the "sniffing" frequency must be increased and the system's PRF decreases significantly. On the other hand, if the amount of "sniffing" is minimized, then the interference modeling will not be as precise. In accordance with a preferred embodiment of this invention, "sniffing" is no longer needed. Instead, the interference sources are modeled as a sparse linear combination of a few active cosine and sine waves whose frequencies are estimated directly from past-collected radar data.

Using a preferred embodiment and method of the present invention, the influence of noise signals is effectively removed from radar signals via sparse recovery using a technique that models the interference as a sparse linear combination of cosine and sine waves (tones) of various frequencies. The RFI frequency coverage range is estimated from previously-collected radar data in common operation mode resulting in the elimination of the "sniffing" stage. Instead of notching out the sub-bands or frequency ranges that are RFI-dominant, a joint sparse recovery optimization is employed in which the RFI-dominant sub-bands are represented by a dictionary of cosine/sine tones whereas the radar signals are captured by a signal dictionary—constructed from the transmitted radar signal at different phase shifts. With these two sparsifying dictionaries, sparse-recovery optimization automatically separates the interference noise components from the radar signal components in the time domain and hence, the RFI sources are extracted from the radar data. Advantages of this technique are that the time-domain extraction of RFI noise does not result in (i) large sidelobes in the time domain of the received signal and (ii) reduced target amplitudes. Another advantage is that it is completely adaptive with the changing environment and does not assume any prior knowledge (amplitude, frequency band, modulation scheme, etc.) of the interference sources. In other words, the invented technique simultaneously estimates (i) the radar signal and (ii) the interference noise signal, both of which have been mixed together in the raw data observation. Lastly, the preferred embodiment radar system does not require monitoring or "sniffing" of the noise signals in the environment.

FIG. 1 illustrates overall schematic system block diagram of a preferred embodiment. At each pulse repetition interval (PRI), the radar transmitter 101 transmits radar signals to the area of interest and receives return radar signals that correspond to the physical objects from the area. The transmitter 101 transmits an ultra wide band signal (UWB), however, the use of the preferred embodiment is not limited to UWB signals. The backscattered pulses are reflected from objects in the scene. The receiver 102 receives the return radar signals that may be severely contaminated by inference sources such as radio, TV, cellular phones, communication systems, etc.

The signal recovery processor uses two dictionaries 104 and 105. The dictionary 105 includes the phase-shifted versions of the radar point-target response which is defined as the system's response to a point-target of interest. More precisely, this point-target response is the reconstructed signal at the receiver output from a point-like target in the surveyed scene. The point-target response can be represented in time domain s(t) or in frequency domain S(f), where S(f) is the Fourier transform of s(t). S(f) also occupies the same frequency band of the radar transmit signal. The dictionary 104 includes the interference noise signals modeled as pure cosine and sine waveforms at various frequency bands which have been detected as interference-dominant by the RFI spectrum estimator 103, which is a processor which looks for the spikes in the received spectrum and obtains all the bands of the noise; i.e. the frequency location of the interference. In a preferred embodiment, the spectrum estimator may operate on all of the received signals go through the spectrum estimator 103. The system may be adaptive in that multiple receivers may be utilized and if one receiver is receiving excessive noise, the surrounding receivers may be relied on to compensate for the receiver receiving excessive noise. Moreover, the spectrum estimator may store the data previously received and average the present spectrum with the past spectrums. The signal recovery processor 106 estimates, separates, and extracts the noise signal components from the raw received signals to generate clean radar signals. For a typical communications system, the output signals would be processed by a detector. In this radar block diagram, the output signals are sent to the image processor 107, and target detection and classification 108. The resulting radar data, image and detection information are then visualized by the display 109.

The preferred embodiment technique separates the noise signals from radar signals via sparse recovery. This technique directly estimates and subtracts noise signals from the contaminated radar signals. Therefore, it does not suffer from either high sidelobe or reduced target-amplitude effects as in existing notch-filtering approaches. Additionally, the technique is completely adaptive with the changing environment and does not assume any knowledge (amplitude, frequency band, modulation scheme, how many interference sources are present, etc.) of the interference sources. The technique is based on a sparse recovery approach that simultaneously solves for (i) radar signals embedded in noise with large amplitudes and (ii) interference noise signals.

The following sparse-signal sparse-noise model is utilized for the received radar data record $y_i$, where i can be considered as the pulse repetition interval (PRI) index:

$$y_i = x_i + r_i + w_i = D_i^x \alpha_i + D_i^{rfi} e_i + w_i. \quad (1)$$

In this model, the original SAR signal $x_i$ at the i-th aperture is assumed to be sparse with respect to $D_i^x$ the phase-shifted dictionary (105) constructed from our transmitted signal s. The received signal $y_i$ is often contaminated by various different noise sources, modeled here as the RFI $r_i$ and the dense white noise $w_i$. The latter noise component is the common thermal, atmospheric, mechanical noise that exists in any radar and communication system. It is usually modeled as dense Gaussian white noise that is fortunately negligible magnitude-wise. In other words, $w_i$ in equation (1) has small bounded energy $\|w_i\|_2 \leq \sigma$. The RFI $r_i$ noise component is the radio-frequency interference that is significant. The main difference between the two noise sources here is that $r_i$ is sparse with a properly designed RFI noise dictionary and can be captured with only a few significant entries, but each can be large in magnitude, whereas $w_i$ is dense and generally insignificant in magnitude.

RFI sources typically are frequency-sparse compared to the full bandwidth of the radar signals. The frequency-sparse feature of RFI can be easily explained: most modern communication systems rely on modulation to various higher frequencies for data transmission and broadcasting, and each system typically occupies only a few MHz of the spectrum. As a generalized estimation, the RFI noise sources $r_i$ can be captured effectively with its own sparse representation as: $r_i = D_i^{rfi} e_i$, where $D_i^{rfi}$ is the adaptive RFI noise sparsifying dictionary 104 constructed from cosine and sine waveforms.

The first step to construct the RFI dictionary 104 is to exploit important prior knowledge obtained from an RFI spectrum estimator 103. This system component takes advantage of the long-term frequency correlation structure of common RFI-source to provide a rough estimate of frequency bands that are most likely to contain RFI. One particular solution is to average the spectrum of the received radar signals $y_i$ over many apertures within a reasonable spatial-temporal window. More precisely, when processing the received radar signal $y_i$ at aperture position indexed by i, a certain P number of past received signals can be borrowed to form the estimated local spectrum average $Y_i^{average}(f)$ at the i-th location as $$Y_i^{average}(f) = \sum_{k=-P}^{0} |Y_{i+k}(f)|^2$$

$$= \sum_{k=-P}^{0} |X_{i+k}(f) + R_{i+k}(f) + W_{i+k}(f)|^2$$

$$\approx \sum_{k=-P}^{0} |X_{i+k}(f)|^2 + |R_{i+k}(f)|^2$$

where we have made the assumption that the power of the bounded noise component $|W_{i+k}(f)|^2$ is small and all 3 components $\{x_i, r_i, w_i\}$ of the received signal $y_i$ have negligible cross-correlation. This averaging operation in the frequency domain yields a typical spectrum resembling somewhat that illustrated in FIG. 3. Most importantly, the averaging process above identifies the location of the most persistent RFI sources as local peaks (maxima) in the overall observed spectrum due to the energy contribution from the terms $|R_{i+k}(f)|^2$. Note that this operation is locally adaptive and the sensitivity of the operation can be controlled from tuning the parameter P. If the value of P is too small, frequency bands that contain RFI sources of weaker magnitudes may not be located. On the other hand, if the value of P is too large, the RFI spectrum estimation at aperture location i will not truly reflect the interference that affects particularly the received signal at aperture i.

Figure 3:
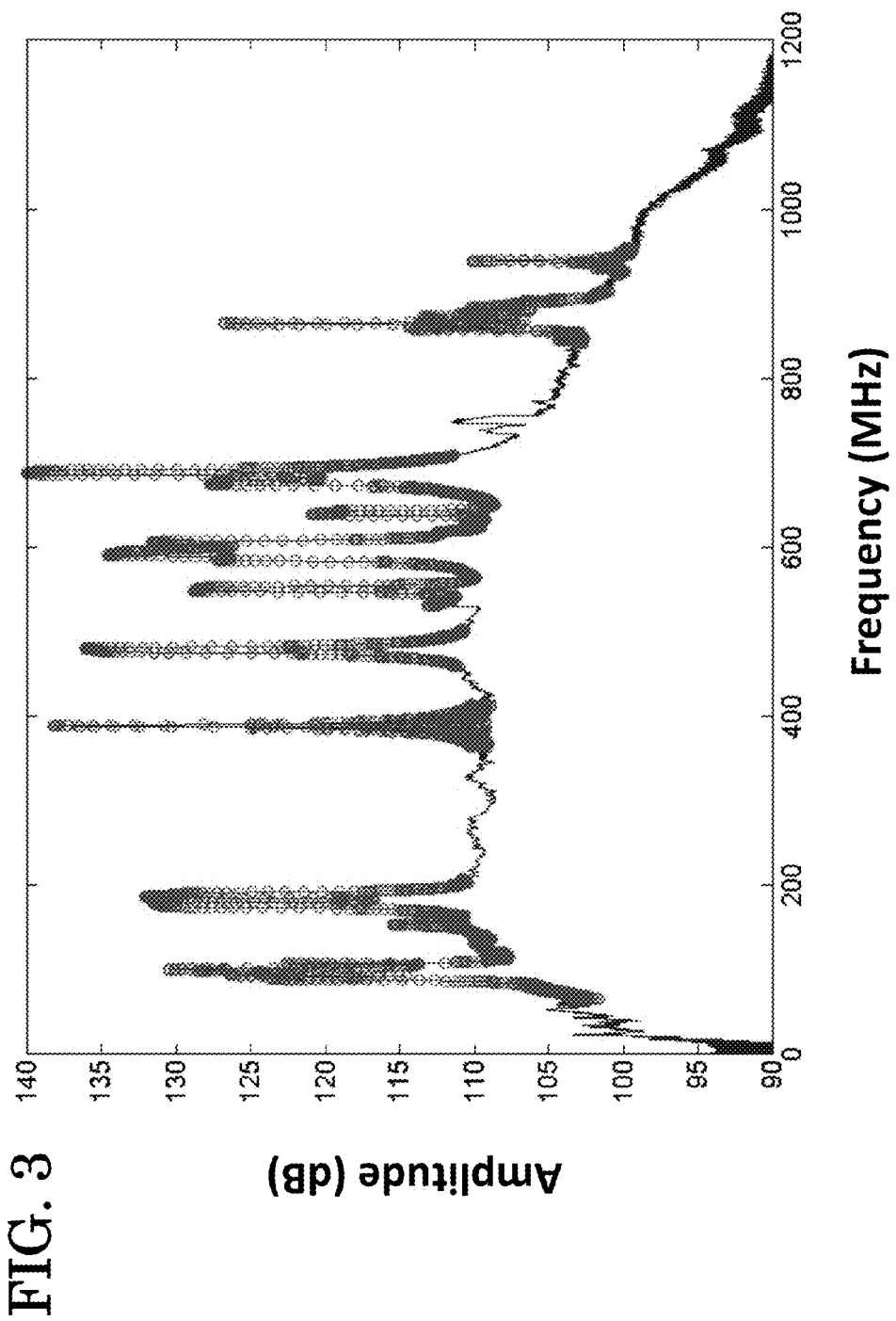
FIG. 3 is an illustration of a typical frequency spectrum showing potential interference at various frequencies. The detected RFI bins are plotted using the symbol "o."

This averaging process identifies the location of the most persistent RFI sources as local peaks (maxima) in the overall observed spectrum. Popular local-maxima identification algorithms can then be applied iteratively to locate frequency bands that contain persistent RFI components. FIG. 3 illustrates an example of this RFI-detection process where red asterisks provide markers for likely RFI-dominant locations in the operating frequency spectrum. More specifically, only sinusoids in frequency bands identified by the RFI spectrum estimator (for example, those marked by the red circles in FIG. 3) are retained in the RFI dictionary $D_i^{rfi}$.

Referring again to FIG. 1, the spectrum estimator 103 detects $M_{RFI}$ frequency bands that are associated with RFI. The $j^{th}$ RFI band (j=1, ..., $M_{RFI}$) spans the frequency range from $f_L(j)$ to $f_H(j)$. For each detected RFI frequency band, a number of pairs of sine and cosine tones (waveforms) are generated to form the sub-dictionary for this RFI band. The RFI dictionary 104 comprises cosine and sine waveforms within the frequency range identified as RFI-contaminated from the RFI spectrum estimator 103.

The steps for forming the RFI comprise:
(1) Averaging the frequency spectrum of the received signals from P neighboring apertures (P is a parameter that can be controlled): frequency bands with significant RFI energy will emerge from the averaging operation;
(2) Filling the RFI dictionary 104 with frequency regions that contain local peaks (maxima) as shown in FIG. 3 (regions in red, which are RFI-contaminated, contain local peaks).

Cosine and sine waves in the regions marked by the color red in FIG. 3 become the atoms (columns) of the estimated noise dictionary 104. The followed-up sparse-recovery optimization algorithm (based on the familiar OMP algorithm that you have seen multiple times) remains exactly the same. This optimization is the step where RFI is separated and then suppressed.

Where the frequency increment between two adjacent tones in the RFI dictionary 104 is $\Delta f_D$, the number of pairs of cosine and sine waveforms to be generated for each RFI band is $$N_j = \text{round}\left(\frac{f_H(j) - f_L(j)}{\Delta f_D}\right).$$

Figure 5A:
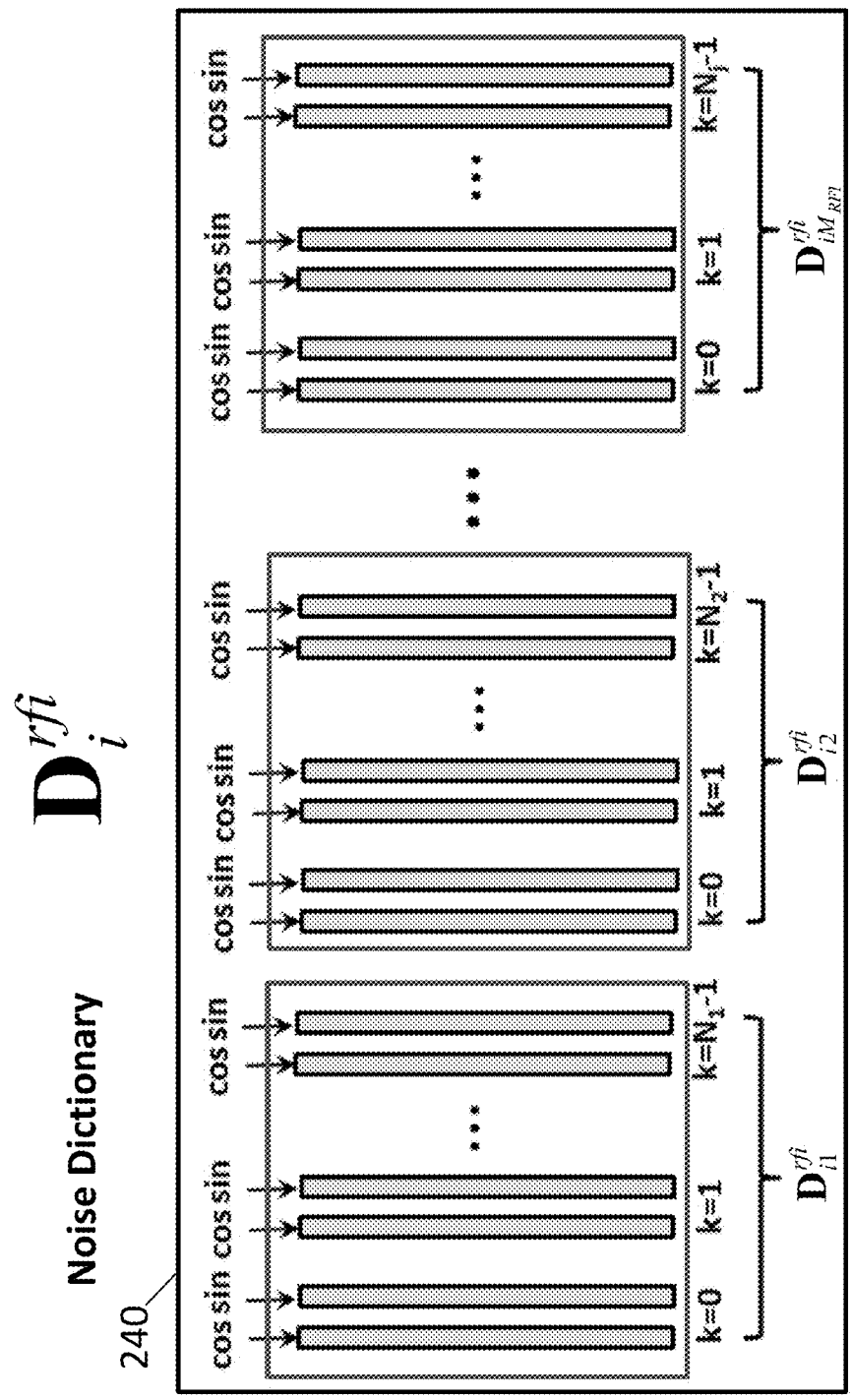
FIG. 5A is a schematic illustration of the matrix containing the RFI noise dictionary $D_i^{rfi}$ (Block 240).

The RFI sub-dictionary that corresponds to the $j^{th}$ RFI band from $f_L(j)$ to $f_H(j)$.

$$D_{ij}^{rfi} = [\cos(2\pi(f_L(j)+k\Delta f_D))|\sin(2\pi(f_L(j)+k\Delta f_D))]$$
$$k=0,\ldots,N_j-1 \quad \text{(Equation 2A)}$$

where for every RFI frequency band that is detected (indexed by j), $f_L(j)$ is the lowest frequency limit of the detected band and $f_H(j)$ is the highest frequency limit of the RFI frequency band. The values of $D_{ij}^{rfi}$ are computed from the above equation form the columns for the dictionary 104, such as, for example, elements 241, 242, and 243. Note that the elements 241-243 represent only examples of elements in 240. A more complete versions is illustrated in FIG. 5A, which contains estimations of the RFI noise component computed using the following Equation 2B.

The RFI dictionary for the $i^{th}$ aperture position is the concatenation of all RFI sub-dictionaries $$D_i^{rfi} = [D_{i1}^{rfi} D_{i2}^{rfi} \ldots D_{ij}^{rfi} \ldots D_{iM_{RFI}}^{rfi}] \quad \text{Equation 2B}$$

where j=1, 2, ..., j ..., $M_{RFI}$. As shown in the arrangement depicted in FIG. 5A, the entries derived from equation 2A are placed vertically as vectors beginning from the lowest frequency band index 1 to the highest frequency band index $M_{RFI}$.

The steps to construct the RFI dictionary 104 are: (i) the RFI spectrum analyzer/estimator 103 estimates the frequency bands that the RFI signals occupy as mentioned above (for example $f_L(j)$ and $f_H(j)$ for the detected frequency band (j)), (ii) for each detected RFI frequency band, the sub-dictionary for this RFI band is constructed by generating pairs of sine and cosine waveforms that spans the frequencies within that band (j) (i.e. the above equation is solved for the matrix $D_{ij}^{rfi}$), and (iii) the RFI dictionary 104 is constructed by concatenating all RFI sub-dictionaries (for each frequency band (j)) generated in previous step). The matrix $D_i^{rfi}$ is illustrated in box 240 of FIG. 5A which contains pairs of sines and cosines spanning the frequencies of the $M_{RFI}$ RFI bands, as indexed by j from 0 to $M_{RFI}$, where M is the total number of detected RFI frequency bands. Note that the RFI dictionary $D_i^{rfi}$ is adaptive. Since the detected RFI frequency bands are data dependent, the RFI dictionary is changed with time. Note that more sophisticated techniques or available prior information can be taken into account to further improve the RFI dictionary as described above.

It is important to note that although the observed scene might be complex with many objects, the complexity M of the receive data record is significantly reduced since the reflections from all targets that have the same range distance from the radar transmitter/receiver would be represented by a single reflection coefficient and phase. The publication by Lam Nguyen and Trac Tran, "Robust Recovery of Synthetic Aperture Radar Data from Uniformly Under-Sampled Measurements," IEEE IGARSS, (Jun. 28, 2011) (hereby incorporated by reference), describes how the model can robustly represent real SAR data, and is herein incorporated by reference.

Referring now to the dictionary 105, this dictionary is constructed from phase-shifted versions of the point-target response signal. In the absence of interference sources, the received signal would be simply the summation of reflections of all targets within the radar's range swath and beamwidth, i.e., ideally the received signal would be composed of a linear combination of delayed and weighted replicas of the point target response. For example, in time domain the received signal would be:

$$y(t) = \sum_{i=1}^{M} \alpha_i s(t - \tau_i), \quad \text{(Equation 3)}$$

where s(t) is the point target response in time domain, the weighting coefficients $\alpha_i$ represent the target amplitudes and the phase-shifting parameters $\tau_i$ model the phase change that corresponds to the delay time it takes the transmit signals to travel the distance between the transmitter/receiver and the point target of interest. In other words, the received signal may comprise the output of a linear time invariant (LTI) system modeled by the reflection coefficients and its sparsity is directly related to the complexity level of the scene.

Once the two sparsifying dictionaries 104 and 105 are obtained, two sparse representations at each aperture i: one for the radar signal $x_i$ and the other for the RFI component $r_i$ may be simultaneously requested. This leads to the following optimization problem, which can be solved approximately with orthogonal matching pursuit (OMP) whose detailed operation steps are shown in FIG. 4.

$$\{\alpha_i', e_i'\} = \arg\min_{\alpha_i, e_i}\{\|\alpha_i\|_0 + \|e_i\|_0\} \quad (4)$$

$$\text{s.t. } y_i = [D_i^x \; D_i^{rfi}]\begin{bmatrix}\alpha_i \\ e_i\end{bmatrix} + w_i.$$

The following relaxed convex optimization problem is also implemented, where $\lambda$ and $\tau$ are tuning parameters that control the trade-offs between the sparsity priors and the observation consistency constraint, as described further in $$\{\alpha_i', e_i'\} = \arg\min_{\alpha_i, \varepsilon_i}\|y_i - D_i^x \alpha_i - D_i^{rfi} e_i\|_2 + \lambda\|\alpha_i\|_1 + \tau\|e_i\|_1. \quad (4A)$$

Figure 2:
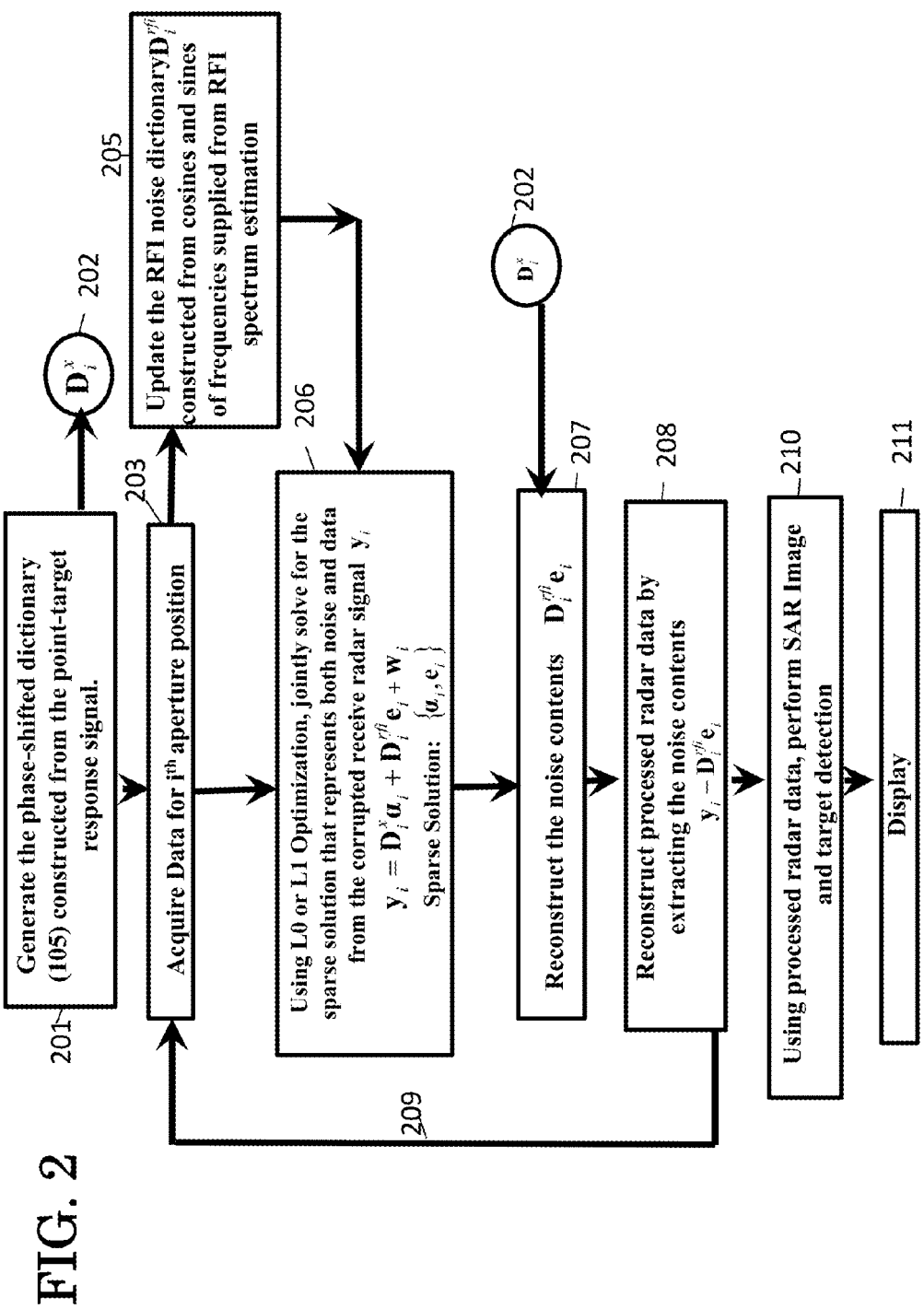
FIG. 2 is a flow chart of a showing the formation of the dictionaries and signal reconstruction in accordance with the present invention.

Note that in both formulations of Equations 4 and 4A, the entries in both dictionaries should be normalized. Hence, the optimization is not dependent on the noise energy level if the parameters λ and τ are pre-determined appropriately. The resulting noise-suppressed signal can then be computed as $x'_i = y_i - D_i^{rfi} e'_i$. Each data record that is expected to contain the SAR signal of interest is recovered independently. All are then supplied to the image processor 107 to produce the final SAR image. FIG. 2 summarizes the extracting of the noise contents and reconstruction of the processed radar data In Box 201 of FIG. 2 a phase-shifted dictionary 105 is generated. This may occur on a one time basis at the start of operations or may be updated as desired to reflect changes in the target area or target range. The circle 202 represents the step of inputting the phase-shifted data into the dictionary 105. In Box 203, the receiver is operational to receive either waveforms reflected from targets (in combination with noise). Box 205 represents the updating of the noise data constructed from cosines and sines of frequencies supplied from RFI spectrum estimation into the dictionary 105. Continuing in the flow chart of FIG. 2, in Box 206, using the data from both dictionaries 104 and 105, the system solves for the sparse solution that represents both noise and data as represented mathematically by the equation in Box 206.

Continuing in the description of the flow chart of FIG. 2, in Box 207, the noise contents is reconstructed as $D_i^{rfi} e_i$ and in Box 208 the signal is reconstructed by extracting the estimated noise contents as $x_i = y_i - D_i^{rfi} e_i$ where the dense noise $w_i$ in equation (1) has been ignored. The steps 203 through 208 are then repeated with the acquisition of new data in another aperture in order to form a complete image. Box 210 represents the image formulation and Box 211 represents the display of the final SAR image. Reference is made to U.S. Patent Application Publication No. 2010/0141508, herein incorporated by reference, for the further information relating to Boxes 210 and 211.

Orthogonal Matching Pursuit

A number of recovery techniques in the current Compressed Sensing (CS) literature can be employed to solve the optimization problem in Equation (4A). In a preferred embodiment, Orthogonal Matching Pursuit (OMP) was used due to its simplicity, recovery robustness, and fast computation. OMP is also very simple to set up: the only required parameter is the sparsity level K. Once the sparsest coefficient vector α is found, the raw data record is recovered as in Equation (4A). All of the recovered data records are then supplied to the back-projection image formation algorithm to produce the final SAR image.

FIG. 4 is a description of a generic Orthogonal Matching Pursuit Algorithm utilized in conjunction with a preferred embodiment of the present invention as represented in FIGS. 1 and 2. In Box 220 α, which represents the coefficients, is initialized. In relation to the preferred embodiment, the coefficients relate to what columns are selected as "best" matches. In Box 221 the parameter r, referred to as the residual, is set initially to y, the incoming received signal. In Box 222, the operation is conducted to find out what is in the dictionary $D_i$ what is the column that most resembles the signal being examined. In Box 223, the objective is to try to find the index of columns with the best match between r and the dictionary $D_i$, which is the solution. In Box 224, the chosen index or indices are appended to the solution vector. In Box 225, the residue r is updated where $D^{P1}$ represents the pseudo inverse of the matrix (dictionary) D. The subtrahend represents the pseudo inverse matrix (dictionary) multiplied by the matrix D multiplied by the signal y. The process stops when all indices corresponding to the solution have been determined. If all indices have not been determined, there is a loop back to Box 222; as once one best match is found, the system loops back to find the second best match and so forth. The term $\alpha_a$ represents all indices of columns corresponding to the approximated solution, which is set forth in Box 226.

Figure 5B:
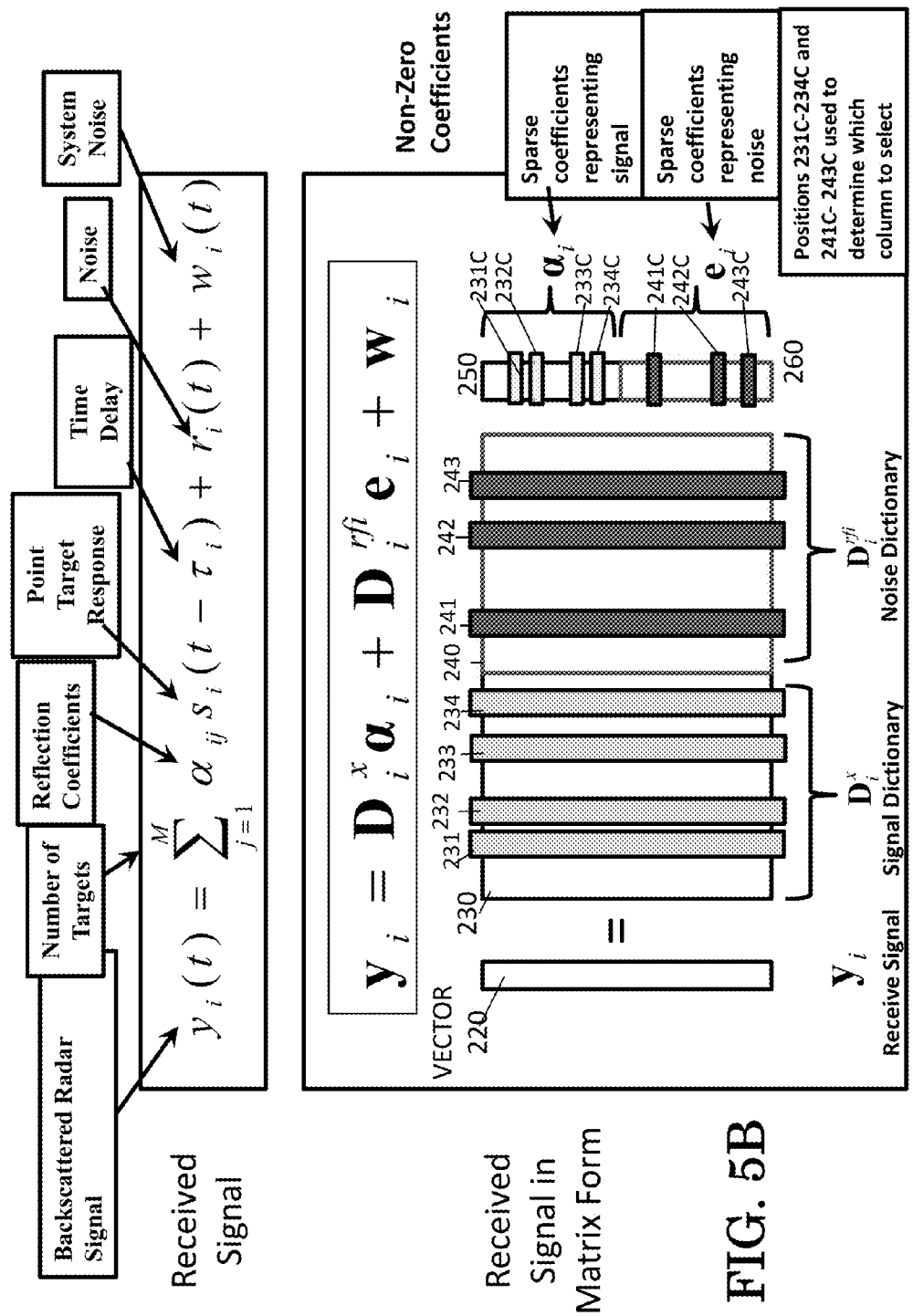
FIG. 5B is an illustration that conceptually illustrates the joint sparse optimization processor involving the signal dictionary $D_i^x$ (Block 230), with a finite number of significant coefficients in $\alpha_i$, which corresponds to the significant targets or objects within the observed scene, and the RFI noise dictionary $D_i^{rfi}$ (Block 240) with a finite number of significant coefficients in $e_i$ (Block 250), which corresponds to the significant RFI noise components present in $y_i$, the received signal at aperture index i.

FIG. 5B is a diagrammatic illustration of the reconstruction of the radar signal y(t) in digital vector format 220 utilized in conjunction with the preferred embodiment and method illustrated in FIGS. 1 and 2. Shown in FIG. 5B are vector components of the signal dictionary 105, the RFI noise dictionary 104, and the sparse coefficient vector memory portion 250. Block 230 indicates the signal dictionary which correlates to the dictionary 105 of FIG. 1. Block 240 indicates the noise dictionary containing the solutions to the equation for $D_{ij}^{rfi}$ which correlates to the noise dictionary 104 of FIG. 1. The columns 231, 232, 233, 234 are selected by the nonzero entries in the solution $\alpha_i$. in the top part of vector memory portion 250. Vector memory portion 250 contains two sections; one selection is the sparse coefficients 231C, 232C, 233C, 234C of the solution $\alpha_i$. and the other portion is the RFI noise coefficients $e_i$ represented by 241C, 242C, 243C, which will determine the location of the nonzero entries in noise dictionary 105. The sparse coefficients 231C, 232C, 233C, and 234C are associated with the columns 231, 232, 233, 234 and the RFI noise coefficients 241C, 242C, 243C are associated with the columns 241, 242, 243. The vector coefficients in vector memory portion 250, which includes both $\alpha_i$ and $e_i$, is obtained from the $L_0$ norm or $L_1$ norm minimization.

Figure 6:
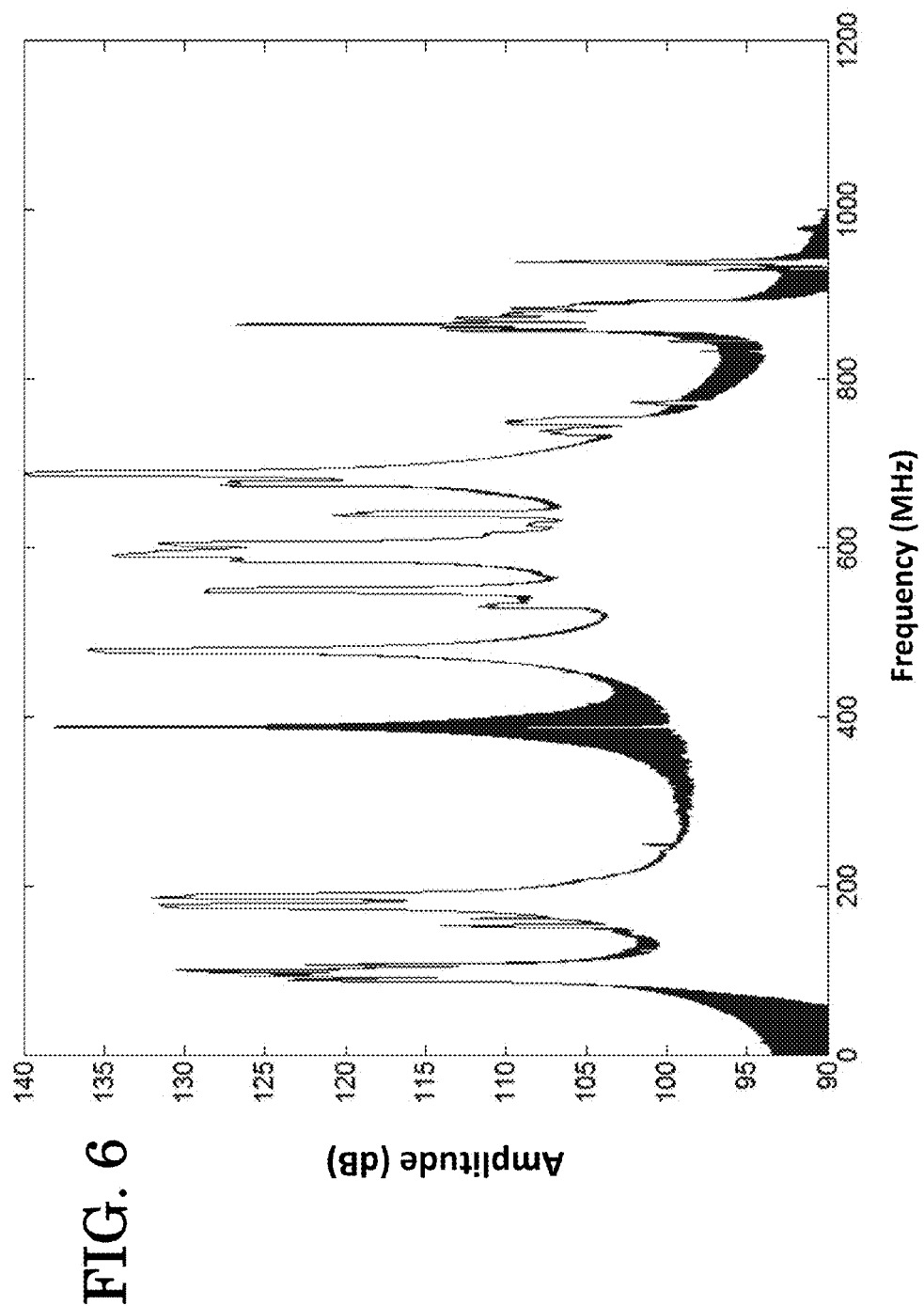
FIG. 6 is an illustration showing a noise frequency spectrum wherein the amplitudes of the signals are shown using a decibel (dB) scale.
Figure 7:
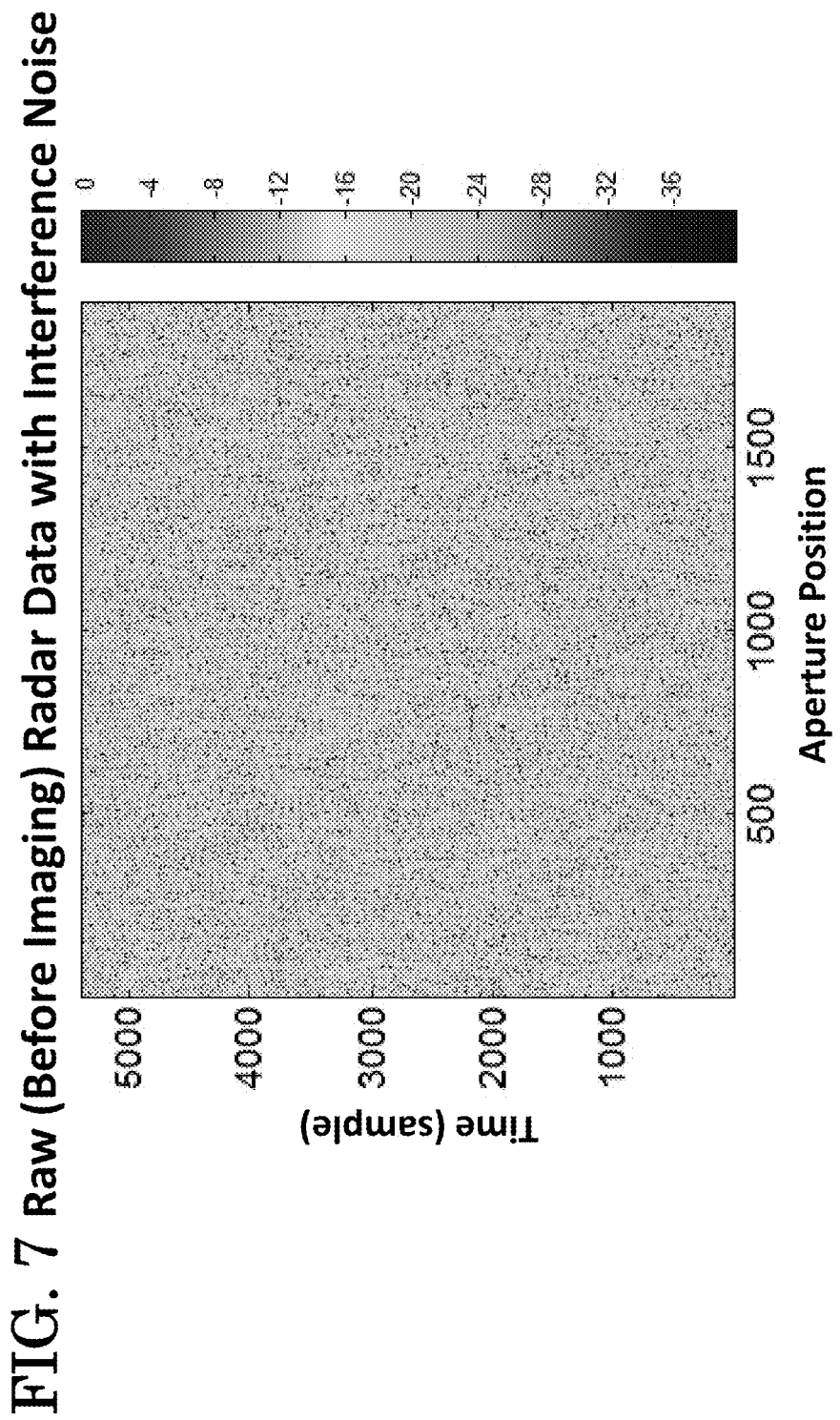
FIG. 7 illustrates a visual depiction of the radar data contaminated with noise signals without any processing.
Figure 8:
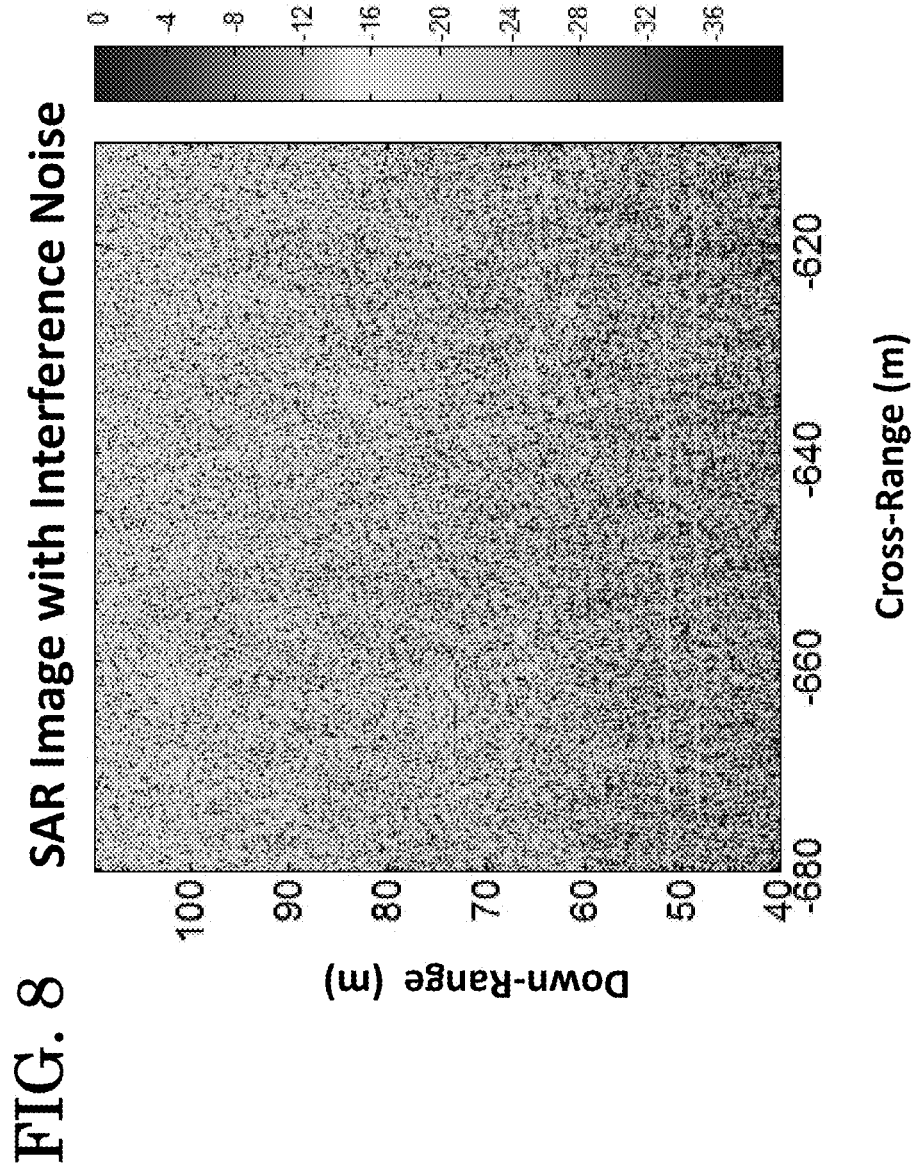
FIG. 8 is an illustration showing a SAR image with interference noise; i.e., an image processed without using the present invention.

The noise extraction technique of the present invention was tested and evaluated using the data from the U.S. Army Research Laboratory (ARL) UWB low-frequency SAR that transmits radar signals occupying the frequency spectrum from 50 to 1150 MHz. Interference noise data was collected from the real environment with the antenna pointing toward Washington, D.C., where a typical example is shown in FIG. 6. For each aperture location i where radar data are collected, the noise record was randomly selected and added to the raw radar data record. FIG. 7 shows a group of raw radar data records that are corrupted by the interference noise (before image formation). Without employing the invented noise extraction technique, the data set of FIG. 7 is sent to the image formation stage to form the noisy radar image that is shown in FIG. 8. The image of FIG. 8 does not show any features from the scene since it is dominated by the high level of noise. This illustrates the severe impact of the interference noise on radar imagery. Next, the data set of FIG. 7 is processed using the invented noise extraction technique. Each column (vertical line) in the image shown in FIG. 7 represents a raw radar record that is contaminated with RFI. The record is color coded using the dB amplitude scale shown by the color bar. Since the RFI noise level is very high compared to the radar signal level, targets cannot be seen in this data visualization.

Figure 9:
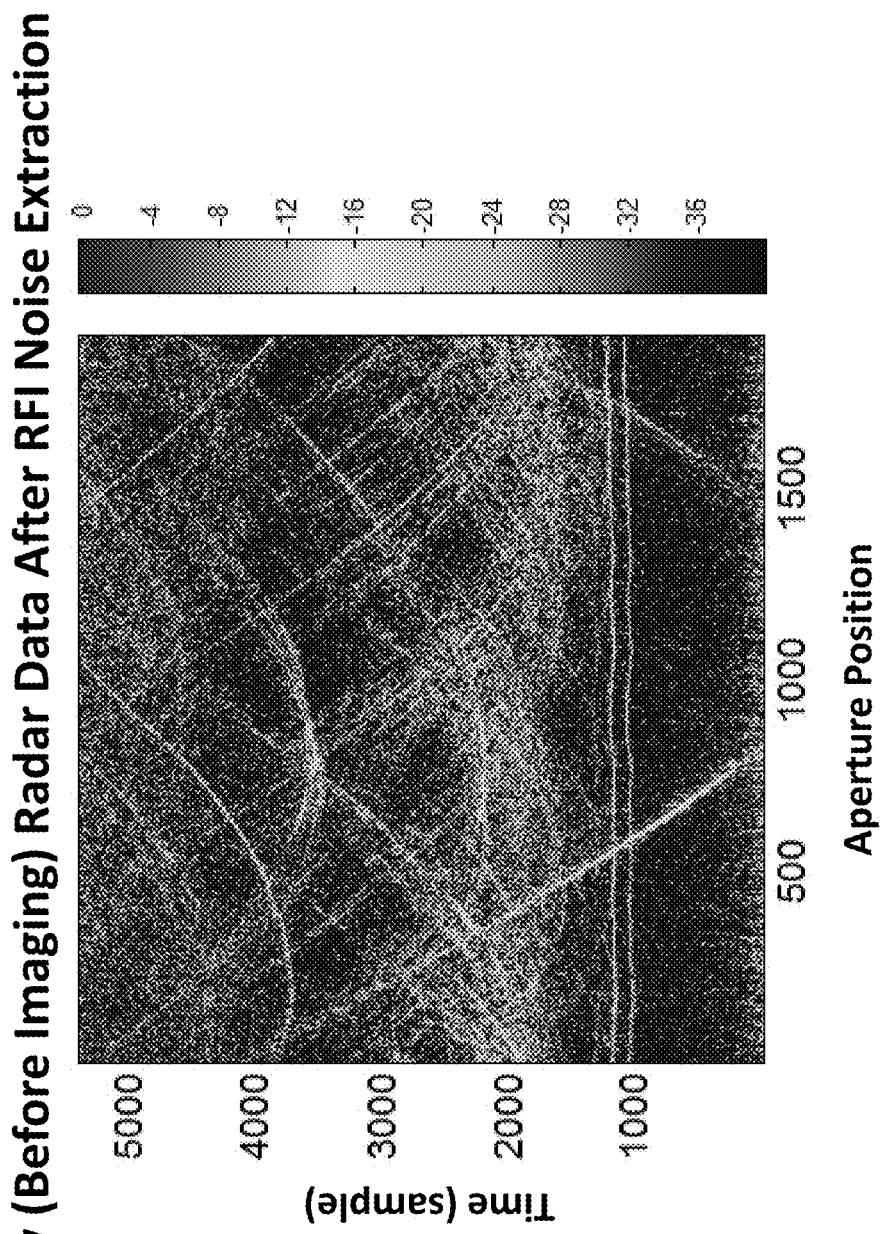
FIG. 9 is an illustration showing raw (before imaging) radar data after RFI noise extraction (using the present invention).
Figure 10:
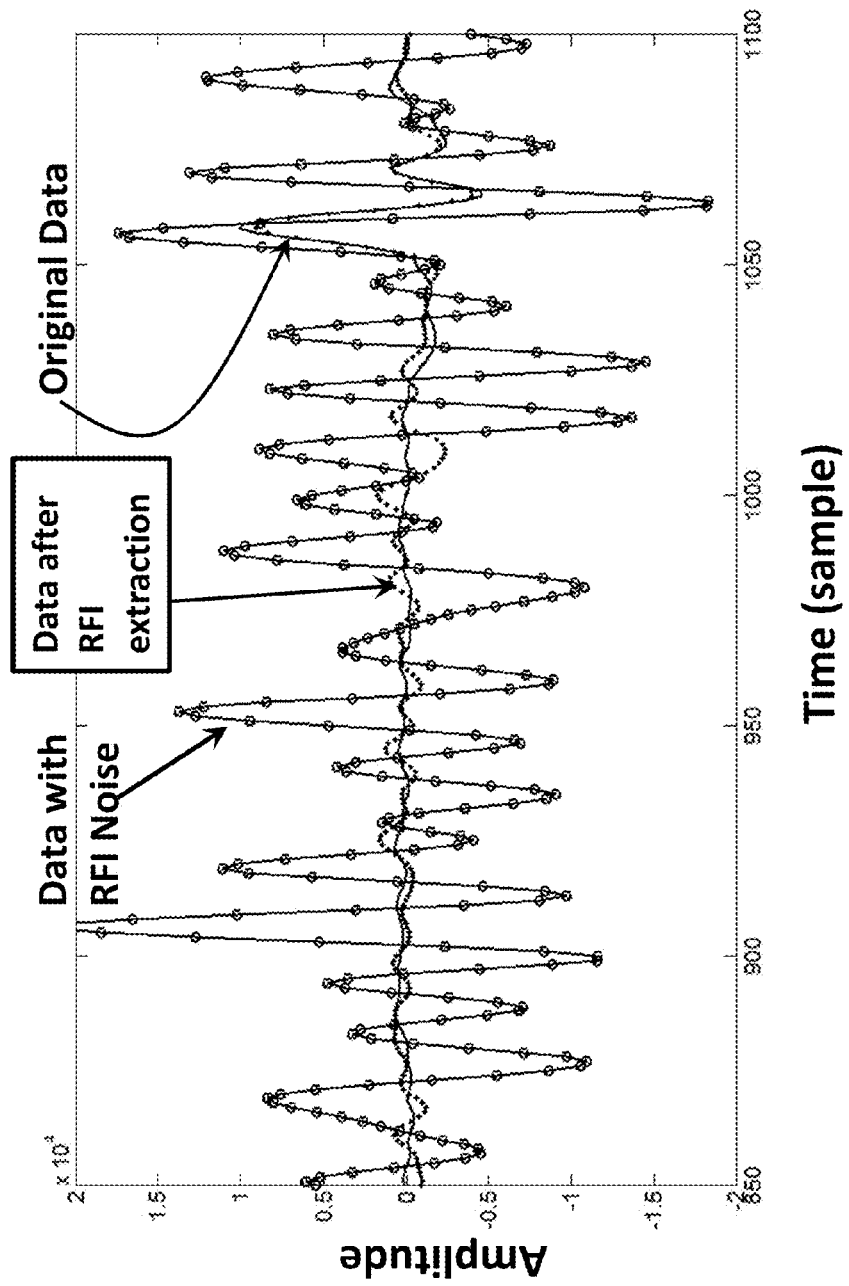
FIG. 10 is a graphical illustration depicting data with RFI noise, original data and data after RFI extraction.

FIG. 9 shows the same group of radar records after using the invented RFI extraction technique. This results in the clean raw radar data set of FIG. 9 that shows the details of the targets in the scene. FIG. 10 compares the time-domain plots of a typical original radar record (solid line), its interference noise corrupted version (line with circles), and its RFI extracted version (dotted line). The noise corrupted curve shows that the target responses are completely obscured by the strong interference noise signals. Although a small level of residual noise still remains in the RFI extracted radar record (green), the responses from the targets are essentially recovered and very well matched with the original data.

Figure 11:
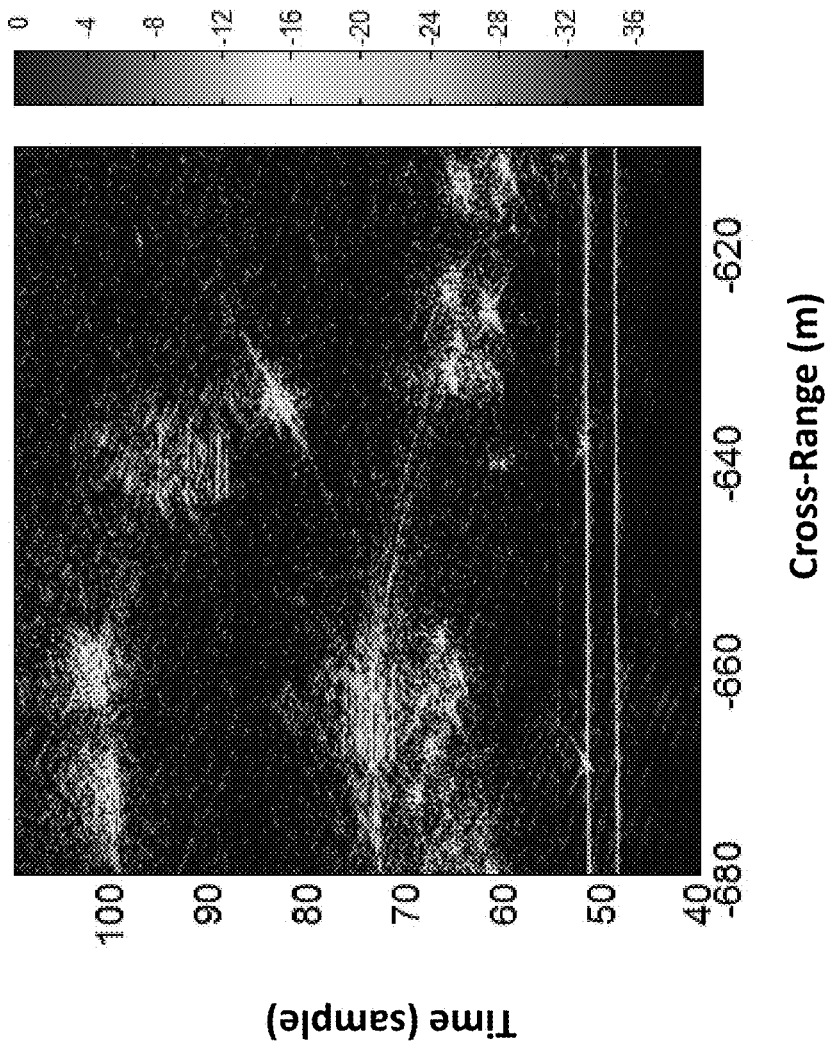
FIG. 11 is an illustration of a resulting outputted SAR image using the invented interference noise extraction technique.

FIG. 11 visually depicts the resulting radar image using the invented interference noise extraction technique. This SAR image shows a few targets (vehicles) hiding behind foliage and tree area. All the details from the targets in the scene showed up clearly in the resulting image. The signal to noise level is improved by approximately 18 dB using the invented technique.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein may comprise hardware and software embodiments. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices (including but not limited to receivers, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

There are various techniques for solving the inverse linear system of equations for the sparsest $\alpha^*$ in the compressed sensing community, which can be classified into two categories:

BASIS PURSUIT via linear programming (as described in E. Candés and T. Tao, "Decoding by linear programming," IEEE Trans. on Information Theory, vol. 51, no. 12, pp. 4203-4215 (December 2005)(hereby incorporated by reference) or gradient projection (as described in M. A. T. Figueiredo, R. D. Nowak, and S. J. Wright, "Gradient projection for sparse reconstruction: Application to compressed sensing and other inverse problems," IEEE Journal of Selected Topics in Signal Processing: Special Issue on Convex Optimization Methods for Signal Processing, vol. 1, no. 4, pp. 586-598 (April 2007) (hereby incorporated by reference);

MATCHING PURSUIT via orthogonal matching pursuit (as described in J. Tropp and A. Gilbert, "Signal recovery from random measurements via orthogonal matching pursuit," IEEE Trans. on Information Theory, vol. 53, no. 12, pp. 4655-4666 (December 2007)(hereby incorporated by reference)) regularized orthogonal matching pursuit (as described in D. Needell and R. Vershynin, "Signal recovery from incomplete and inaccurate measurements via regularized orthogonal matching pursuit," IEEE Journal of Selected Topics in Signal Processing, vol. 4, pp. 310-316 (April 2010) (hereby incorporated by reference)), subspace pursuit (as described further in W. Dai and O. Milenkovic, "Subspace pursuit for compressive sensing: Closing the gap between performance and complexity," IEEE Trans. on Information Theory, vol. 55, pp. 2230-2249 (May 2009) (hereby incorporated by reference)), sparsity adaptive matching pursuit (as described further in T. T. Do, L. Gan, N. H. Nguyen, and T. D. Tran, "Sparsity adaptive matching pursuit algorithm for practical compressed sensing," in Proc. Asilomar Conf. on Signals, Systems, and Computers, pp. 581-587, Pacific Grove (October 2008)(hereby incorporated by reference), etc.

In this implementation the orthogonal matching pursuit technique may be employed as described in J. Tropp and A. Gilbert, "Signal recovery from random measurements via orthogonal matching pursuit," IEEE Trans. on Information Theory, vol. 53, no. 12, pp. 4655-4666 (December 2007) (hereby incorporated by reference) to solve for $\alpha^*$ due to its simplicity, recovery robustness, and fast computation. This algorithm is graphically illustrated in FIG. 4.

Dictionary of Phase Shifted Versions as Sparsifying Matrix

In the vector space $C^N$ of N-dimensional signals, vector x can be represented as $x=\Psi\alpha$, where $\Psi$ is called the sparsifying matrix which in other words, the representation through $\Psi$ can be (and in many cases, should be) close to the original signal x. The sparsifying matrix is said to be complete if its columns span the entire N-dimensional space. The signal x is said to be strictly K-sparse when there are only K non-zero components in $\alpha$. When the sorted magnitudes of ($\alpha_i$) decay very quickly and x can be well approximated with only K components, then x is said to be K-compressible. The effectiveness of the recovery algorithm of a class of signal x heavily depends on the sparsest representation of the signal class.

In standard compressed sensing, fixed linear transform bases such as the DCT, FFT and the discrete wavelet transform (DWT) or a combination of all three are often employed to obtain sparsity. In the UWB SAR system, the transmitted pulse is a monocycle impulse with an approximated bandwidth range of 300-3000 MHz. Current collected raw data captured in the 8 receivers do not exhibit any common sparse pattern. In other words, a quick spectrum analysis reveals that the raw data is not time-sparse or frequency sparse or even wavelet sparse. Hence, a naïve direct application of Compressed Sensing (CS) via random projection with Fourier, cosine, or wavelet bases yields disappointing results.

As used herein "processor" may include but is not limited to a computer, central processing unit (CPU), microprocessor, multiprocessor, main frame computer, personal computer, or laptop computer.

As used herein the terminology "matching pursuit" means a technique for finding the "best matching" projections of multidimensional data onto an over-complete dictionary. As stated in Wikipedia, the basic idea is to represent a signal from Hilbert space as a weighted sum of functions (called atoms) taken from called atoms) taken from D:

$$f(t) = \sum_{n=0}^{+\infty} a_n g_{\gamma_n}(t)$$

where indexes the atoms that have been chosen, and a weighting factor (an amplitude) for each atom. Given a fixed dictionary, matching pursuit will first find the one atom that has the biggest inner product with the signal, then subtract the contribution due to that atom, and repeat the process until the signal is satisfactorily decomposed. By taking an extremely redundant dictionary one can look in it for functions that best match a signal. Finding a representation where most of the coefficients in the sum are close to 0 (sparse representation) is desirable for signal coding and compression.

Although a preferred embodiment of the invention discloses application of this technique for radar applications only, it is within the skill of the art to use the spectral recovery techniques of the present invention to such applications as communications systems, including UWB communication systems. In addition to radar, the invented noise extraction technique may be applied to any communications systems that suffer from interference noises. Examples of such practical systems and applications include: radars operating in combative environments with frequent enemy jamming; audio recordings with background noise; noise-cancellation headphones in noisy environments such as airplanes, airports, construction sites, etc.

As used herein, the terminology "sparsity driven" of "sparsity-driven" is a relative term relating to the finding of a compressible solution which is intended to be treated broadly. For example, a sparse matrix is a matrix with enough zeros that it pays to take advantage of them; commonly interpreted from an economics view point in that if one can save time and memory by exploiting the zeros, then a matrix is sparse. The terminology sparsity refers to the selection of a model, within a hierarchy of model classes, that yields a compact representation; i.e. a model that depends on only a few of the observations, selecting a small subset of features for classification or visualization. Selection of an optimal representation which is sufficiently sparse enables efficient computation by optimization techniques and alleviates the extreme difficulty encountered without sufficient sparsity.

As used herein, the terminology "target" area means area of interest, which may be, for example, a scene, an animal or human body or portion thereof, face (as in face recognition), object, ground region, field, landscape, aerial environment, or a combination thereof.

The term "noise" as used herein relates to observation noise. There are many sources that cause noise in the resulting observed signal. Noise can be divided into two categories: additive noise and multiplicative noise. System noise, thermal noise, quantization noise, self-interference noise, radio frequency interference (RFI) noise are some examples of the additive noise. Multiplicative noise is much more difficult to deal with since it is data dependent. Some sources that cause multiplicative noise include: timing jitter in data sampling, small aperture size compared to image area, the under-sampling of aperture samples, the non-uniform spacing between aperture samples, errors in position measurement system, etc. Multiplicative noise results in undesired sidelobes that create high noise floor in the image and thus limit the ability to detect targets.

As used herein, the terminology "dictionary" means an organized listing of data stored in machine-readable form for reference. The dictionary may be located in any type of storage or memory for storage of data. As an example, the "dictionary" may comprise phase shifted versions of the point target response.

As used herein the terminology "memory" or "memory portion" means computer memory used to store data on a temporary or permanent basis for use in conjunction with computer, processor, microprocessor, or the like. The term "memory" means any physical system that can store data. As used herein, when the terms "first" memory and "second" memory are used, the first and second memories may be portions or areas of the same memory; i.e., separate storage areas within a memory device or a plurality of memory devices.

As used herein the terminology "processor" means computer, microprocessor, CPU, desktop computer, laptop, tablet, mobile processor, main frame, or the like.

As used herein the terminology "spectrum estimator" includes a spectrum analyzer and a spectrum detector which detects interfering signals. For example, the detector will detect any frequency band that has higher power than the spectral response of a radar system As used herein, the "point-target response" means a reconstructed (or in radar terminology, range-compressed) signal from a point-like target at the receiver output. The "point-target response" can be represented in time domain as s(t) (echo from a point-target) or in frequency domain as S(f), where S(f) is the Fourier transform of s(t). S(f) also occupies the same frequency band of the radar transmit signal. The transmit pulse can be short impulse, chirp (frequency modulation), or stepped sine waves. As an example of a "point-target response," in the case of impulse radar, the radar transmits a short pulse s(t) that occupies the full bandwidth of the radar. In theory, if the transmit antenna, the receive antenna, the radar electronics are perfect, the echo from a point target should be $s(t-t_0)$, which is exactly the same as s(t) with a time delay $t_0$. In the perfect case, the point-target response is a stored replica of the transmit signal upon reflection from a point-like target (taking into account the processing of the system). However, since the radar components (antennas, electronics) have their own transfer functions, the echo from a point target would be s'(t) with some delay, which is a modified version of s(t). For simplicity, it is assumed that s'(t)=s(t). The echo signal s(t) or s'(t) is called range-compressed signal. The "point-target response" may be based upon construction at the receiver output and may be computed from the radar parameters. The typical composite return signal from a scene is a linear combination of many point target responses with various phases and amplitudes. For frequency modulation (FM) radar, the transmit signal p(t) also occupies the full bandwidth of the radar but is stretched in time. Thus, at the receiver the response from a point-target must be reconstructed by matching the echo signal p(t−$t_0$) to the transmit signal to get the equivalent range-compressed signal s(t) as in the case of impulse radar. As a further example, for stepped-frequency radar, the radar transmits many pulses (each with a single frequency), and many echo signals from a point-target are used to reconstruct the equivalent range-compressed signal s(t) as in the case of impulse radar. In the case of frequency modulated radar or stepped frequency radar, the "point-target response" means, as used herein, the range-compressed point-target response. This is because impulse radar transmit signal occupies the full frequency band in a very short time (hence, range-compressed). Frequency modulated radar transmit signal occupies the full frequency band in a longer time interval (thus the need for a reconstructed range-compressed signal). Stepped-frequency only transmits one frequency at a time. It eventually transmits all frequency in the band after a number of transmit pulses. The term "point target response" includes impulse response in time or spatial domain or transfer function in the frequency domain from any radar, communication, signal processing systems. The term "point target response" also covers point spread function in imaging systems.

As used herein the terminology "spectral" means of or relating to a spectrum. The terminology "spectrum" refers to a band, portion or region of the electromagnetic spectrum which may or may not be continuous, for example, the radio spectrum is the region of the electromagnetic spectrum spanning the radio frequency range. The terminology "spectra" is the plural of spectrum.

As used herein, the terminology "noise extracted signal" refers to the estimation of the received signal without noise or interfering signals.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for reception of electromagnetic waves in spectrum in which interference with radio frequencies of other electronics devices occurs comprising;
    at least one transmitter configured to transmit signals at a wide range of frequencies, including frequencies in which RF devices transmit;
    at least one receiver configured to receive the received signal;
    a first memory portion configured to store data relating to a point target response of the system derived from the transmitted signals;
    a spectrum estimator configured to estimate the frequencies at which interfering signals occur;
    at least one processor operatively connected to the receiver, the first memory portion and the spectrum estimator; the at least one processor configured to generate an estimation of the interfering signals at the frequencies estimated by the spectrum estimator;
    a second memory portion operatively connected to the at least one processor configured to store the estimation of the components of the interfering signals;
    the at least one processor configured to substantially reduce or eliminate radio frequency interfering signals from the received signal utilizing the point target response from the first memory portion and the estimation of the interfering signals from the second memory portion.

2. The system of claim 1 wherein the spectrum estimator is configured to generate an estimation of the interfering signals at the frequencies estimated by the spectrum estimator.

3. The system of claim 1 wherein the second memory portion comprises an estimation of the components of the interfering signal generated using sinusoidal representations.

4. The system of claim 3 wherein the at least one processor is configured to utilize an optimization process in conjunction with the sinusoidal representations to determine amplitudes and frequency locations of the noise components in the received signal.

5. The system of claim 4 wherein the at least one processor is configured to perform an optimization process to estimate the interfering signals using one of orthogonal matching pursuit, basis pursuit, gradient projection, matching pursuit, orthogonal matching pursuit, regularized matching pursuit or subspace pursuit.

6. The system of claim 3 wherein the sinusoidal representations of the interfering signal are generated using the equation $$D_{ij}^{rfi}=[\cos(2\pi(f_L(j)+k\Delta f_D))|\sin(2\pi(f_L(j)+k\Delta f_D)]$$
$$k=0,\ldots,N_j-1$$

where j is the index for the RFI frequency band, $f_L(j)$ is the lowest frequency of the detected band, k is the frequency index, $\Delta f_D$ is the frequency increment, $N_j$ is the total number of sine and cosine pairs within the RFI frequency band and wherein components of $D_{ij}^{rfi}$ are concatenated for insertion into the second memory portion.

7. The system of claim 1 wherein the first memory portion is constructed using phase shifted replicas of the point target response which correspond to received signals reflected back from objects in the scene of interest located at specific distances, and wherein the at least one processor is configured to match the receive data with phase shifted replicas of the point target response to determine a composite response of the target or targets from a scene of interest.

8. The system of claim 7 wherein each column in the first memory portion comprises a vector representing a phase shifted replica that has a length n elements in a column that corresponds to the range swath of the radar and wherein columns range in distance such that each column represents a target at a different distance.

9. The system of claim 1 wherein the at least one processor is configured to use an optimization process in conjunction with the point target response from the first memory portion and the components of the interfering signal from the second memory portion to jointly determine a composite response of the target or targets from a scene of interest and the estimated interfering signals.

10. The system of claim 9 wherein the at least one processor is configured to provide a noise extracted output signal derived by subtracting the estimated interfering signals from the received signal data.

11. The system of claim 1 wherein the first and second memory portions comprise rows and columns for storage of point target response data and components of the interfering signal, the at least one processor configured to form a combined memory portion from the first and second memory portions, and the at least one processor configured to correlate the received signal to the entries in the combined memory portion to find the best matching columns, the at least one processor configured to select the best matching columns associated with second memory portion to estimate the interfering signal data in the received signal, and the at least one processor configured to extract the estimated interfering signal data from the received signal to generate an improved radar signal.

12. The system of claim 11 wherein the at least one processor is configured to find the best matching columns in the combined memory portion utilizing the L1 norm determined using the equation $$\{\alpha'_i, e'_i\} = \underset{\alpha_i, e_i}{\operatorname{argmin}} \left\| y_i - D_i^x \alpha_i - D_i^{rfi} e_i \right\|_2 + \lambda \|\alpha_i\|_1 + \tau \|e_i\|_1$$

where y is the received signal, $e_i$ represents the coefficients that include amplitudes and locations of the interference noise components in the second memory portion, $\alpha_i$ represents the coefficients that include amplitudes and locations of the signal components in the first memory portion, $D_i^x$ represents a first dictionary in the first memory portion, $D_i^{rfi}$ represents a second dictionary in the second memory portion, and $\lambda$ and $\tau$ represent constants.

13. The system of claim 11 wherein the at least one processor is configured to find the best matching columns in the combined memory portion utilizing the $L_0$ norm determined using the equation $$\{\alpha'_i, e'_i\} = \underset{\alpha_i, e_i}{\arg\min}\{\|\alpha_i\|_0 + \|e_i\|_0\}$$
$$\text{s.t. } y_i = [D_i^x \ D_i^{rfi}] \begin{bmatrix} \alpha_i \\ e_i \end{bmatrix}$$

where y is the received signal, $e_i$ represents the coefficients that include amplitudes and locations of the interference noise components in the second memory portion, $\alpha_i$ represents the coefficients that include amplitudes and locations of the signal components in the first memory portion, $D_i^x$ represents a first dictionary in the first memory portion, and $D_i^{rfi}$ represents a second dictionary in the second memory portion.

14. A method for obtaining image data utilizing the transmission of electromagnetic waves in spectrum in which interference with electromagnetic waves at various frequencies occurs comprising;
providing at least one processor;
providing at least one transmitter operatively connected to the at least one processor;
providing at least one receiver operatively connected to the at least one processor;
transmitting signals into a target area having a wide frequency range, including frequencies in which other RF devices transmit;
using the at least one receiver, receiving a signal comprising the reflection of the transmitted signals and interfering signal data from other RF devices;
providing a first memory portion for storing replicas of the point target response signal operatively associated with the at least one processor;
providing a spectrum estimator operatively associated with the at least one receiver and the at least one processor configured to identify the frequency bands at which interfering signals occupy;
generating an estimation of the interfering signals at the frequencies estimated by the spectrum estimator for storage in the second memory portion;
providing a second memory portion to store the estimation of components of the interfering signals;
matching the receive signal with stored replicas of the point target response and extracting data relating to the interfering signals from the received signal to determine a composite response of the target or targets from a scene of interest.

15. The method of claim 14 wherein the estimation of the components of the interfering signals stored in the second memory portion is generated using sinusoidal representations.

16. The method of claim 15 wherein the estimation of components of the interfering signals are stored in matrices $D_{ij}^{rfi}$ defined in the equation $$D_{ij}^{rfi} = [\cos(2\pi(f_L(j)+k\Delta f_D))|\sin(2\pi(f_L(j)+k\Delta f_D))]$$
$$k=0,\ldots,N_j-1$$

where j is the index for the RFI frequency band, $f_L(j)$ is the lowest frequency of the detected band, k is the frequency index, $\Delta f_D$ is the frequency increment, $N_j$ is the total number of sine and cosine pairs within the RFI frequency band; and the matrices $D_{ij}^{rfi}$ are concatenated for insertion into the second memory portion.

17. The method of claim 15 wherein the estimation of the components of the interfering signals stored in the second memory portion are generated using complex representations of sinusoidal signals.

18. A system for reception of electromagnetic waves in spectrum in which interference with radio frequencies of other electronics devices occurs comprising;
at least one transmitter configured to transmit signals at a wide range of frequencies, including frequencies in which RF devices transmit;
at least one receiver configured to receive the received signal;
a first memory portion configured to store data relating to a point target response of the system derived from the transmitted signals;
a spectrum estimator configured to estimate the frequencies at which interfering signals occur;
at least one processor operatively connected to the receiver, the first memory portion and the spectrum estimator; the at least one processor configured to generate an estimation of the interfering signals at the frequencies estimated by the spectrum estimator;
a second memory portion operatively connected to the at least one processor configured to store the estimation of the components of the interfering signals;

the at least one processor configured to substantially reduce or eliminate radio frequency interfering signals from the received signal by utilizing an optimization process in conjunction with the point target response from the first memory portion and the estimation of the components of the interfering signals from the second memory portion to jointly determine a composite response of the target or targets from a scene of interest.

19. The system of claim 18 wherein the second memory portion comprises an estimation of the components of the interfering signal generated using sinusoidal representations and wherein the sinusoidal representations of the interfering signal are generated using the equation $$D_{ij}^{rfi} = [\cos(2\pi(f_L(j)+k\Delta f_D))|\sin(2\pi(f_L(j)+k\Delta f_D)]$$
$$k=0,\ldots,N_j-1$$

where j is the index for the RFI frequency band, $f_L(j)$ is the lowest frequency of the detected band, k is the frequency index, $\Delta f_D$ is the frequency increment, $N_j$ is the total number of sine and cosine pairs within the RFI frequency band and wherein the matrices of $D_{ij}^{rfi}$ are concatenated for insertion into the second memory portion.

20. The system of claim 18 wherein the at least one processor is configured to utilize an optimization process in conjunction with the sinusoidal representations to determine amplitudes and frequency locations of the noise components in the received signal.

* * * * *